(12) United States Patent
Tatsumura et al.

(10) Patent No.: US 10,817,304 B2
(45) Date of Patent: Oct. 27, 2020

(54) CALCULATING DEVICE

(71) Applicant: Kabushiki Kaisha Toshiba, Tokyo (JP)

(72) Inventors: Kosuke Tatsumura, Kanagawa (JP); Hayato Goto, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 124 days.

(21) Appl. No.: 16/118,646

(22) Filed: Aug. 31, 2018

(65) Prior Publication Data

US 2019/0278610 A1    Sep. 12, 2019

(30) Foreign Application Priority Data

Mar. 9, 2018 (JP) ................................ 2018-043217

(51) Int. Cl.
  *G06F 9/38* (2018.01)
  *G06F 7/72* (2006.01)
  (Continued)

(52) U.S. Cl.
  CPC .............. *G06F 9/3893* (2013.01); *G06F 7/57* (2013.01); *G06F 7/72* (2013.01); *G06F 9/3001* (2013.01)

(58) Field of Classification Search
  CPC . G06F 7/57; G06F 7/72; G06F 9/3001; G06F 9/3893
  (Continued)

(56) References Cited

U.S. PATENT DOCUMENTS 4,789,957 A * 12/1988 Niehaus .............. G06F 9/30094
                                                      708/518

7,865,542 B2 *  1/2011 New ........................ G06F 7/02
                                                      708/490
(Continued)

FOREIGN PATENT DOCUMENTS

JP        2003-15704 A    1/2003
JP       2007-522699 A    8/2007
(Continued)

OTHER PUBLICATIONS

Inagaki et al., "A coherent Ising machine for 2000-node optimization problems," Science (Nov. 2016), vol. 354, No. 6312, pp. 603-606.
(Continued)

*Primary Examiner* — Tan V Mai
(74) *Attorney, Agent, or Firm* — Finnegan, Henderson, Farabow, Garrett & Dunner, L.L.P.

(57) ABSTRACT

According to one embodiment, a calculating device includes a first memory, a second memory, a third memory, a first arithmetic module, a second arithmetic module, a first conductive line electrically connecting a first output terminal of the first memory and a first input terminal of the first arithmetic module, a second conductive line electrically connecting a second output terminal of the first memory and a first input terminal of the second arithmetic module, a third conductive line electrically connecting a first output terminal of the second memory and a second input terminal of the second arithmetic module, a fourth conductive line electrically connecting a first output terminal of the third memory and a third input terminal of the second arithmetic module, and a fifth conductive line electrically connecting a first output terminal of the second arithmetic module and a second input terminal of the first arithmetic module.

20 Claims, 28 Drawing Sheets

(51) Int. Cl.
*G06F 9/30* (2018.01)
*G06F 7/57* (2006.01)

(58) Field of Classification Search
USPC .................................................. 708/490, 514
See application file for complete search history.

(56) References Cited

U.S. PATENT DOCUMENTS

| | | |
|---|---|---|
| 2015/0278408 A1 | 10/2015 | Yoshimura et al. |
| 2016/0065210 A1 | 3/2016 | Yoshimura et al. |
| 2017/0272087 A1 | 9/2017 | Kanao et al. |

FOREIGN PATENT DOCUMENTS

| | | |
|---|---|---|
| JP | 2015-191340 A | 11/2015 |
| JP | 5865456 B1 | 2/2016 |
| JP | 2017-167749 A | 9/2017 |
| WO | WO 2005/066832 A3 A2 | 7/2005 |

OTHER PUBLICATIONS

Supplementary Materials for Inagaki et al., "A coherent Ising machine for 2000-node optimization problems," Science First Release (Oct. 20, 2016), pp. 1-15.

Goto, "Bifurcation-based adiabatic quantum computation with a nonlinear oscillator network," Scientific Reports (Feb. 22, 2016), pp. 1-8.

Haribara et al., "Performance evaluation of coherent Ising machines against classical neural networks," Quantum Science and Technology (Aug. 14, 2017), pp. 1-8.

Haribara et al., "Performance evaluation of coherent Ising machines against classical neural networks," Quantum Science and Technology, arXiv:1706.01283v2 [quant-ph] (Jun. 13, 2017), pp. 1-11.

\* cited by examiner $$JXF\ JX(J,X) = dt \times c \times \sum_{j=0}^{N-1} J_{ij} x_j$$

$$JXF \quad JX(J,X') = \sum_{j=0}^{N-1} J_{ij}x'_j = \sum_{j=0}^{N-1} J_{ij}(dt \times c \times x_j)$$

Jin/Xin : INT/INT or Float/Float

Jin/Xin : INT/Float or INT4/INT32, so on.

$$FY(y_i) \stackrel{def}{=} dt \times D \times y_i$$
$$FX(x_i) \stackrel{def}{=} dt \times (p - D - x_i^2) x_i - ch_i a$$

$$y_{out} = FX(x_{in}) + y_{in}$$
$$x_{out} = FY(y_{out}) + x_{in}$$

$$y_1 = FX(x_{in}) + y_{in}$$
$$x_1 = FY(y_1) + x_{in}$$
$$y_2 = FX(x_1) + y_1$$
$$x_2 = FY(y_2) + x_1$$
$$y_3 = FX(x_2) + y_2$$
$$x_3 = FY(y_3) + x_2$$
$$y_4 = FX(x_3) + y_3$$
$$x_4 = FY(y_4) + x_3$$
$$y_{out} = FX(x_4) + y_4$$
$$x_{out} = FY(y_5) + x_4$$

$$x_{out} = FY(y_{in}) + x_{in}$$
$$y_{out} = FX(x_{out}) + y_{in}$$

$$x_1 = FY(y_{in}) + x_{in}$$
$$y_1 = FX(x_1) + y_{in}$$
$$x_2 = FY(y_1) + x_1$$
$$y_2 = FX(x_2) + y_1$$
$$x_3 = FY(y_2) + x_2$$
$$y_3 = FX(x_3) + y_2$$
$$x_4 = FY(y_3) + x_3$$
$$y_4 = FX(x_4) + y_3$$
$$x_{out} = FY(y_4) + x_4$$
$$y_{out} = FX(x_{out}) + y_4$$

CALCULATING DEVICE

CROSS-REFERENCE TO RELATED APPLICATIONS

This application is based upon and claims the benefit of priority from Japanese Patent Application No. 2018-043217, filed on Mar. 9, 2018; the entire contents of which are incorporated herein by reference.

FIELD

Embodiments described herein relate generally to a calculating device.

BACKGROUND

For example, a calculating device that can quickly solve a large-scale optimization problem is desirable.

DETAILED DESCRIPTION

Figure 1:
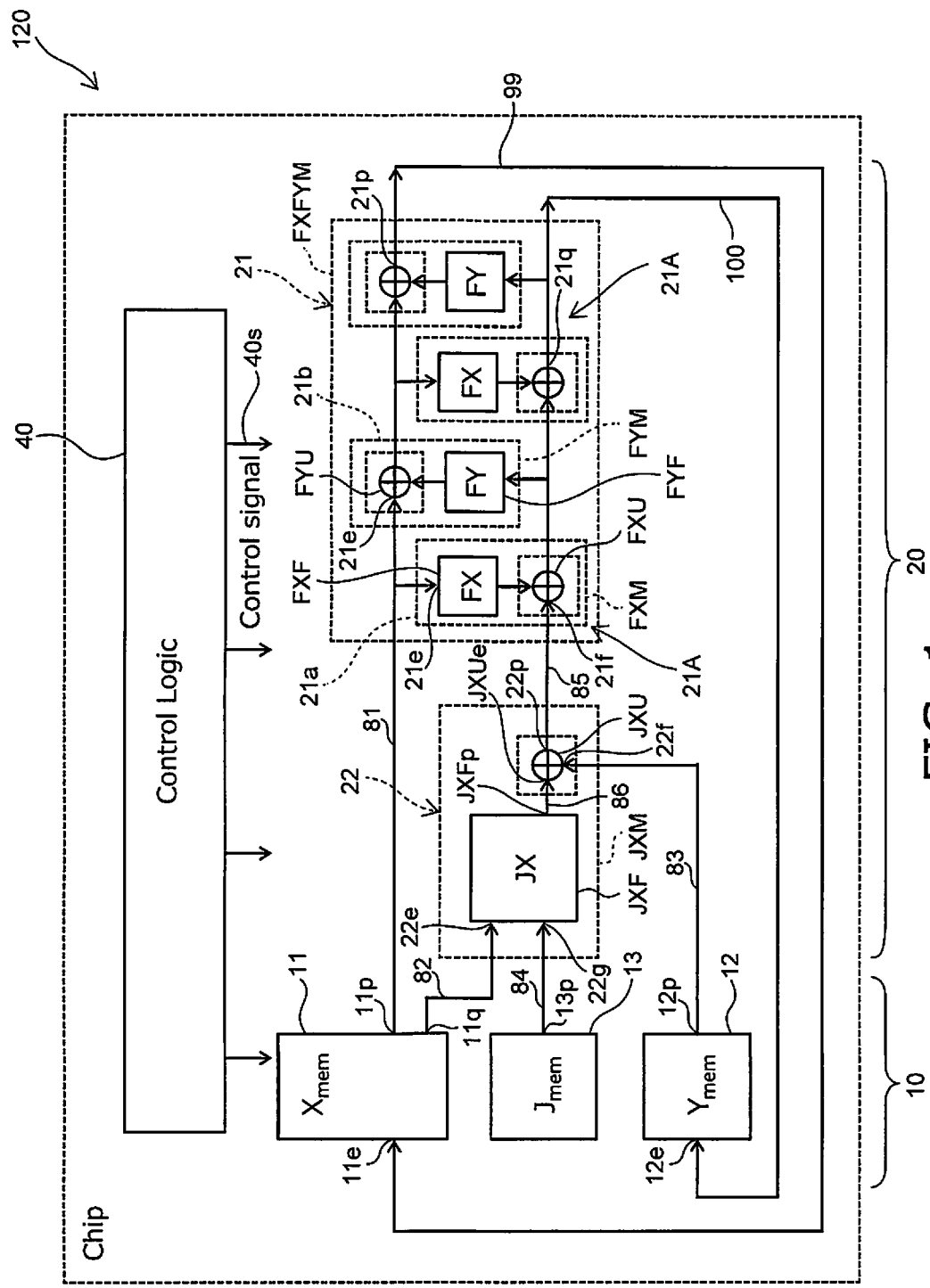
FIG. 1 is a schematic view showing a calculating device according to a first embodiment.

According to one embodiment, a calculating device includes a first memory, a second memory, a third memory, a first arithmetic module, a second arithmetic module, a first conductive line electrically connecting a first output terminal of the first memory and a first input terminal of the first arithmetic module, a second conductive line electrically connecting a second output terminal of the first memory and a first input terminal of the second arithmetic module, a third conductive line electrically connecting a first output terminal of the second memory and a second input terminal of the second arithmetic module, a fourth conductive line electrically connecting a first output terminal of the third memory and a third input terminal of the second arithmetic module, and a fifth conductive line electrically connecting a first output terminal of the second arithmetic module and a second input terminal of the first arithmetic module.

According to another embodiment, a calculating device includes a first global memory, a first module, and a second module. The first module includes a first memory, a second memory, a third memory, a first arithmetic module, a second arithmetic module, a first conductive line electrically connecting a first output terminal of the first memory and a first input terminal of the first arithmetic module, a second conductive line electrically connecting a first output terminal of the first global memory and a first input terminal of the second arithmetic module, a third conductive line electrically connecting a first output terminal of the second memory and a second input terminal of the second arithmetic module, a fourth conductive line electrically connecting a first output terminal of the third memory and a third input terminal of the second arithmetic module, a fifth conductive line electrically connecting a first output terminal of the second arithmetic module and a second input terminal of the first arithmetic module, a nineteenth conductive line electrically connecting a first output terminal of the first arithmetic module and a first input terminal of the first memory, a twentieth conductive line electrically connecting a second output terminal of the first arithmetic module and a first input terminal of the second memory, and a twenty-first conductive line electrically connecting the first output terminal of the first arithmetic module and a first input terminal of the first global memory. The second module includes another first memory, another second memory, another third memory, another first arithmetic module, another second arithmetic module, another first conductive line electrically connecting a first output terminal of the other first memory and a first input terminal of the other first arithmetic module, another second conductive line electrically connecting the first output terminal of the first global memory and a first input terminal of the other second arithmetic module, another third conductive line electrically connecting a first output terminal of the other second memory and a second input terminal of the other second arithmetic module, another fourth conductive line electrically connecting a first output terminal of the other third memory and a third input terminal of the other second arithmetic module, another fifth conductive line electrically connecting a first output terminal of the other second arithmetic module and a second input terminal of the other first arithmetic module, another nineteenth conductive line electrically connecting a first output terminal of the other first arithmetic module and a first input terminal of the other first memory, another twentieth conductive line electrically connecting a second output terminal of the other first arithmetic module and a first input terminal of the other second memory, and another twenty-first conductive line electrically connecting the first output terminal of the other first arithmetic module and a second input terminal of the first global memory.

According to another embodiment, a calculating device includes a first chip, a second chip, and an interconnection wiring. The first chip includes a first memory including a first local memory and a first global memory, a second memory, a third memory, a first arithmetic module, a second arithmetic module, a first conductive line electrically connecting a first output terminal of the first local memory and a first input terminal of the first arithmetic module, a second conductive line electrically connecting a first output terminal of the first global memory and a first input terminal of the second arithmetic module, a third conductive line electrically connecting a first output terminal of the second memory and a second input terminal of the second arithmetic module, a fourth conductive line electrically connecting a first output terminal of the third memory and a third input terminal of the second arithmetic module, a fifth conductive line electrically connecting a first output terminal of the second arithmetic module and a second input terminal of the first arithmetic module, a nineteenth conductive line electrically connecting a first output terminal of the first arithmetic module and a first input terminal of the first local memory, and a twentieth conductive line electrically connecting a second output terminal of the first arithmetic module and a first input terminal of the second memory. The interconnection wiring electrically connects the first output terminal of the first arithmetic module and a first input terminal of the first global memory. The second chip includes another first memory including another first local memory and another first global memory, another second memory, another third memory, another first arithmetic module, another second arithmetic module, another first conductive line electrically connecting a first output terminal of the other first local memory and a first input terminal of the other first arithmetic module, another second conductive line electrically connecting a first output terminal of the other first global memory and a first input terminal of the other second arithmetic module, another third conductive line electrically connecting a first output terminal of the other second memory and a second input terminal of the other second arithmetic module, another fourth conductive line electrically connecting a first output terminal of the other third memory and a third input terminal of the other second arithmetic module, another fifth conductive line electrically connecting a first output terminal of the other second arithmetic module and a second input terminal of the other first arithmetic module, another nineteenth conductive line electrically connecting a first output terminal of the other first arithmetic module and a first input terminal of the other first local memory, and another twentieth conductive line electrically connecting a second output terminal of the other first arithmetic module and a first input terminal of the other second memory. The interconnection wiring electrically connects the first output terminal of the other first arithmetic module and a first input terminal of the other first global memory.

Various embodiments will be described hereinafter with reference to the accompanying drawings.

In the specification and drawings, components similar to those described or illustrated in a drawing thereinabove are marked with like reference numerals, and a detailed description is omitted as appropriate.

First Embodiment

FIG. 1 is a schematic view showing a calculating device according to a first embodiment.

As shown in FIG. 1, the calculating device 120 according to the embodiment includes a first memory 11, a second memory 12, a third memory 13, a first arithmetic module 21, and a second arithmetic module 22. For example, these memories are included in a storer 10. For example, these arithmetic modules are included in an arithmetic part 20.

The output of the first memory 11 is input to the first arithmetic module 21. The output of the first memory 11 is input to the second arithmetic module 22. The output of the second memory 12 is input to the second arithmetic module 22. The output of the third memory 13 is input to the second arithmetic module 22. The output of the second arithmetic module 22 is input to the first arithmetic module 21.

A control circuit 40 may be provided in the calculating device 120. The operations of the storer 10 and the arithmetic part 20 recited above are controlled by control signals 40s output from the control circuit 40.

In one example, the first memory 11 stores a first variable group {x}. In one example, the second memory 12 stores the second variable group {y}. In one example, the third memory 13 stores the first parameter group {J}.

The first memory 11 is, for example, an Xmem memory. The second memory 12 is, for example, a Ymem memory. The third memory 13 is, for example, a Jmem memory.

The first arithmetic module 21 is, for example, an FXFY module FXFYM. The second arithmetic module 22 is, for example, a JX module JXM.

In one example, for example, the calculating device 120 can efficiently perform the following arithmetic. For example, the first variable group {x} includes N (N being an integer of 2 or more) ith entries of a first variable xi (i being an integer not less than 1 and not more than N). The second variable group {y} includes N ith entries of a second variable yi (i being an integer not less than 1 and not more than N). The first parameter group {J} includes N×N first parameters $J_{l,m}$ (l being an integer not less than 1 and not more than N, and m being an integer not less than 1 and not more than N). For example, the first arithmetic module 21 performs a first variable update and a first sub-update. For example, the second arithmetic module 22 performs a second sub-update. The first variable update includes updating the ith entry of the first variable xi based on the ith entry of the second variable yi. The first sub-update includes updating the ith entry of the second variable yi based on the ith entry of the first variable xi. The second sub-update includes updating the ith entry of the second variable yi based on at least a part of the first parameter group {J} and at least a part of the first variable group {x}.

According to the calculating device 120 according to the embodiment, for example, an optimization problem can be calculated quickly.

The calculating device 120 may include, for example, a FPGA (Field programmable gate array), a gate array, or an application specific integrated circuit (ASIC). For example, the calculating device 120 may have a single-chip structure.

The Xmem memory, the Ymem memory, and the Jmem memory each are, for example, an on-chip memory. The on-chip memories each include, for example, at least 1 write and 1 read port.

Figures 8A, 8B, 8C:
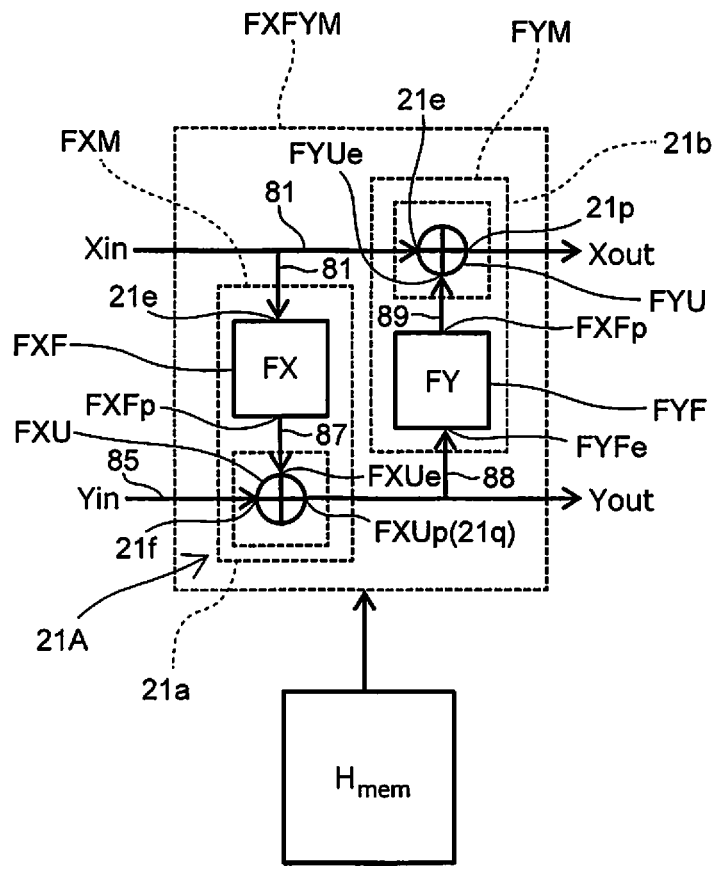
FIG. 8A to FIG. 8C are schematic views showing the calculating device according to the first embodiment.

The calculating device 120 may include a Hmem memory (referring to FIG. 8A to FIG. 8C, etc.). For example, the Hmem memory stores a second parameter group {h}. The Hmem memory is an on-chip memory. The on-chip memory includes, for example, 1 write and 1 read port. The Hmem memory may be omitted the case where the second parameter group {h} is not provided.

The calculating device 120 is, for example, a synchronous circuit. The synchronous circuit includes, for example, a recurrent data path structure.

In the calculating device 120, the initial values of the first variable group {x} and the second variable group {y} and the first parameter group {J} are stored in the storer 10. As necessary, the second parameter group {h} may be stored in the storer 10. The calculating device 120 is driven only the desired number of clock cycles. For example, the time evolutions of the first variable $x_i$ and the second variable $y_i$ are calculated.

Figure 20:
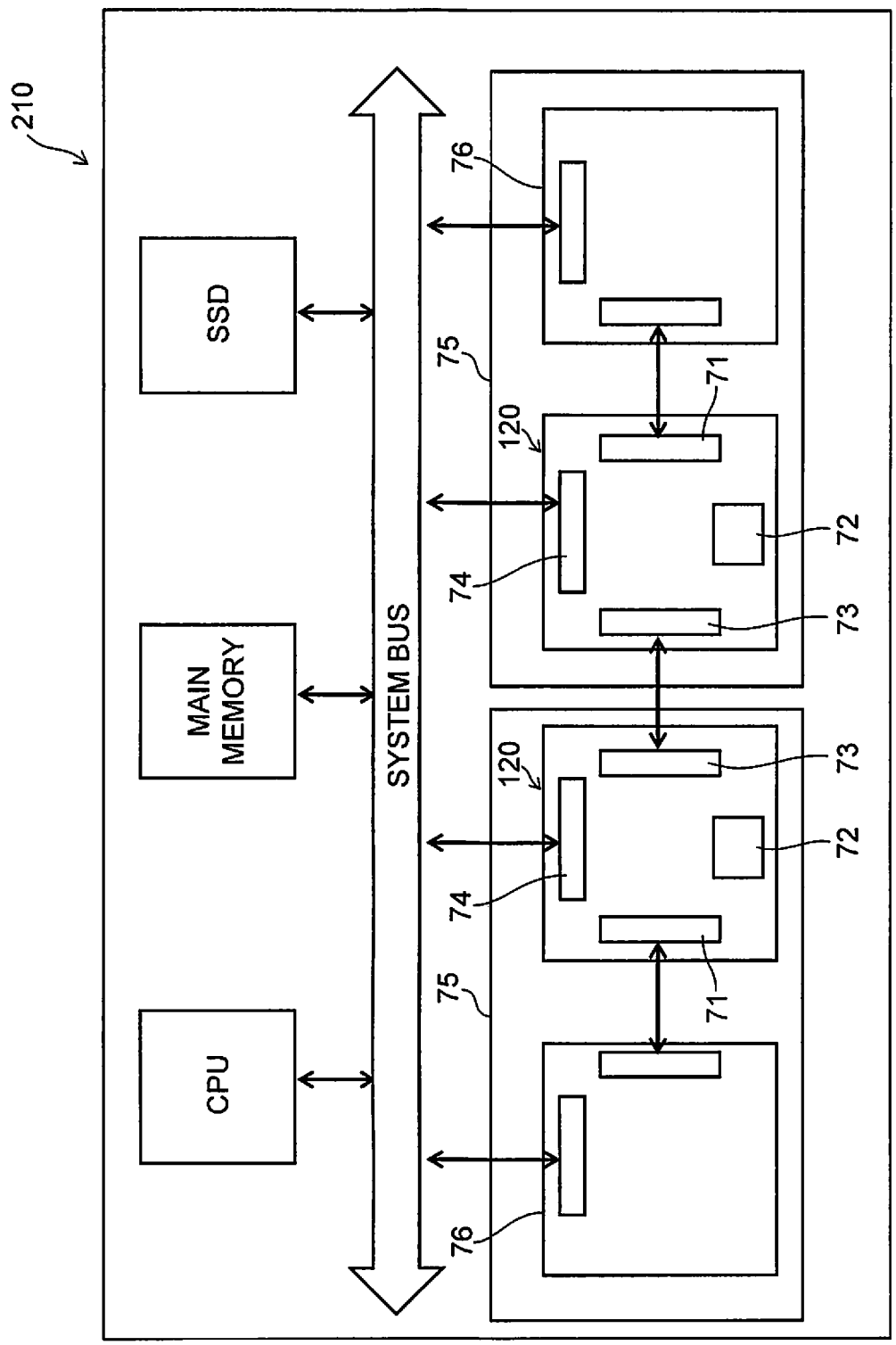
FIG. 20 is a schematic view illustrating an information processing device including the calculating device according to the embodiment.
Figure 21:
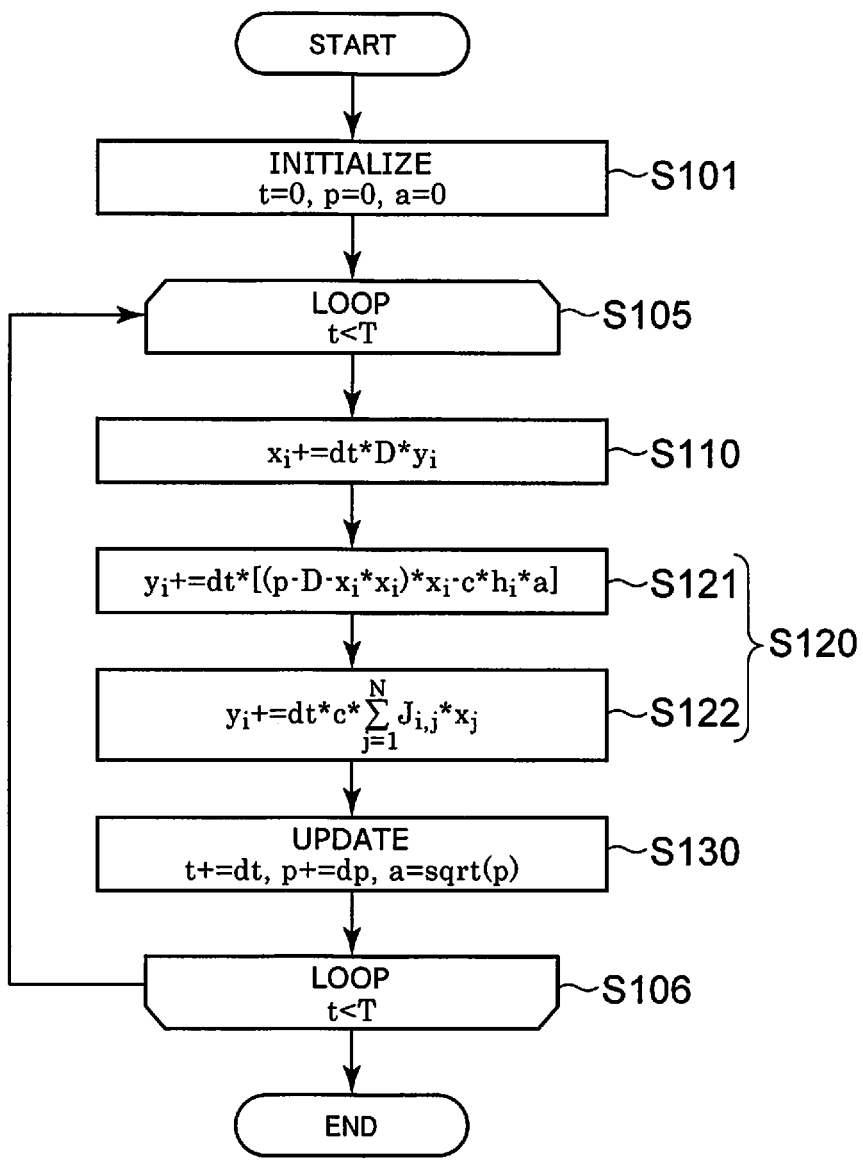
FIG. 21 is a flowchart illustrating operation of the calculating device according to the embodiment.
Figure 22:
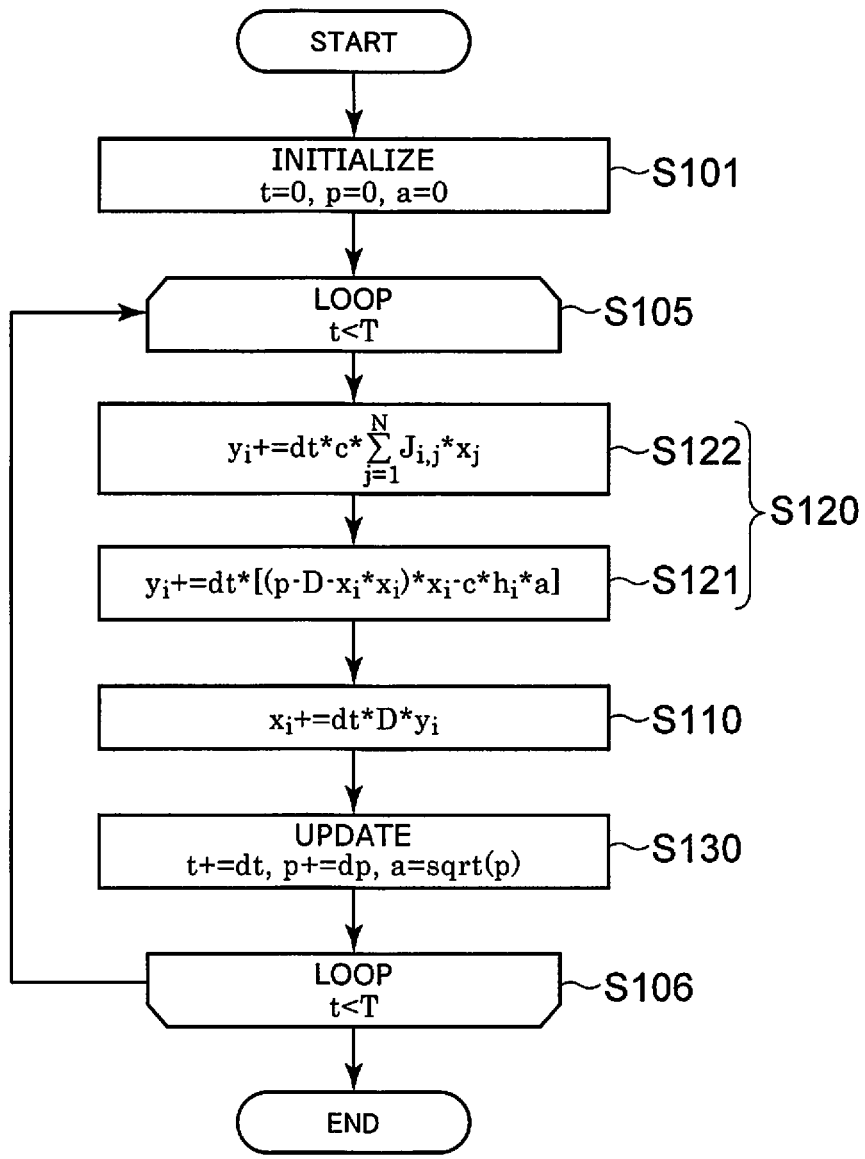
FIG. 22 is a flowchart illustrating operation of the calculating device according to the embodiment.
Figure 23:
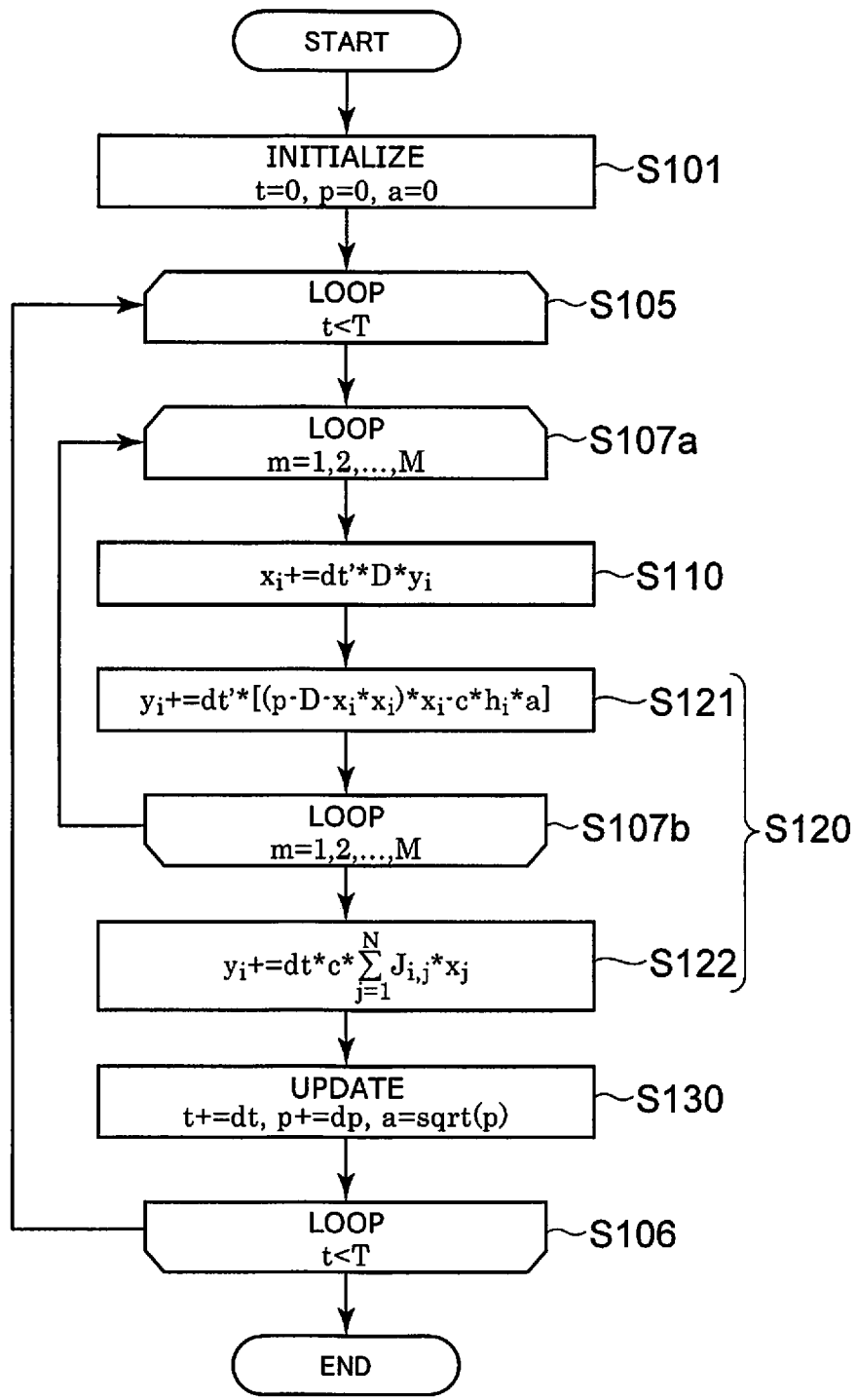
FIG. 23 is a flowchart illustrating operation of the calculating device according to the embodiment.
Figure 24:
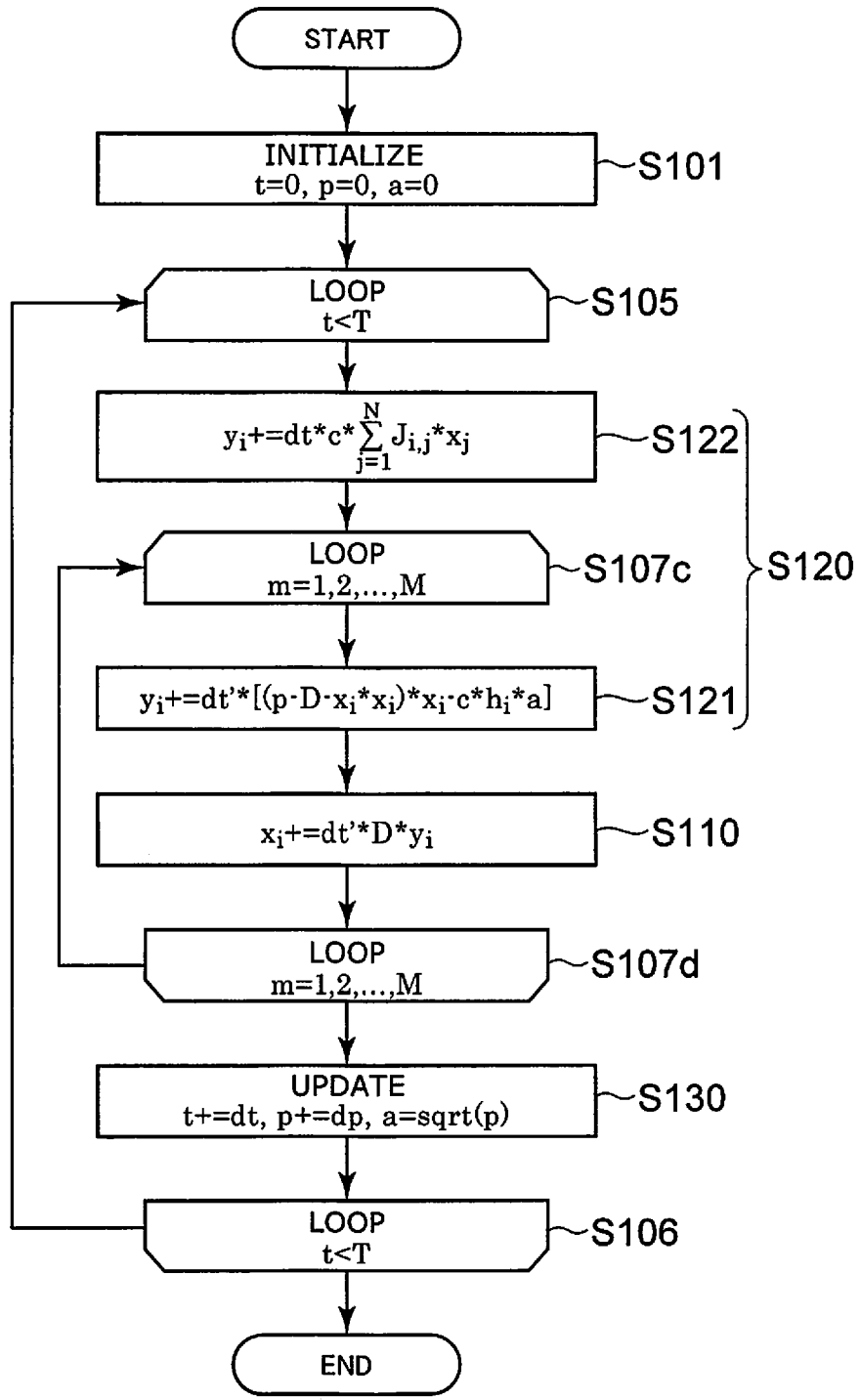
FIG. 24 is a flowchart illustrating operation of the calculating device according to the embodiment.
Figure 25:
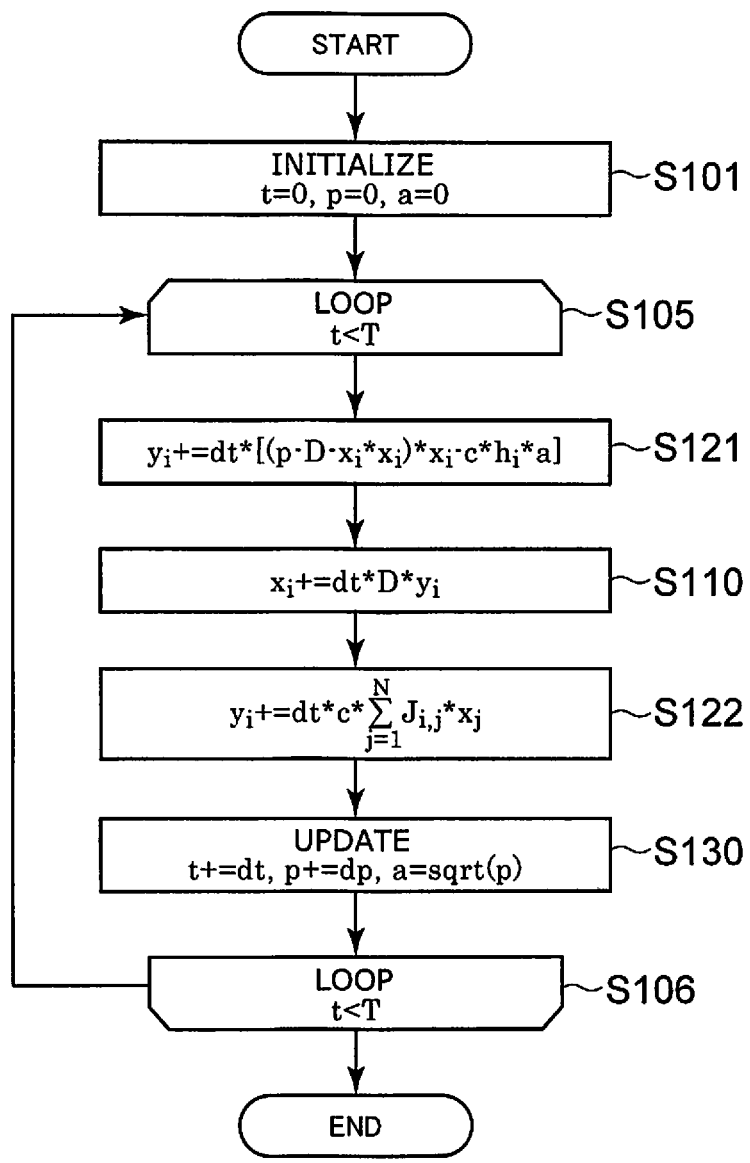
FIG. 25 is a flowchart illustrating operation of the calculating device according to the embodiment.
Figure 26:
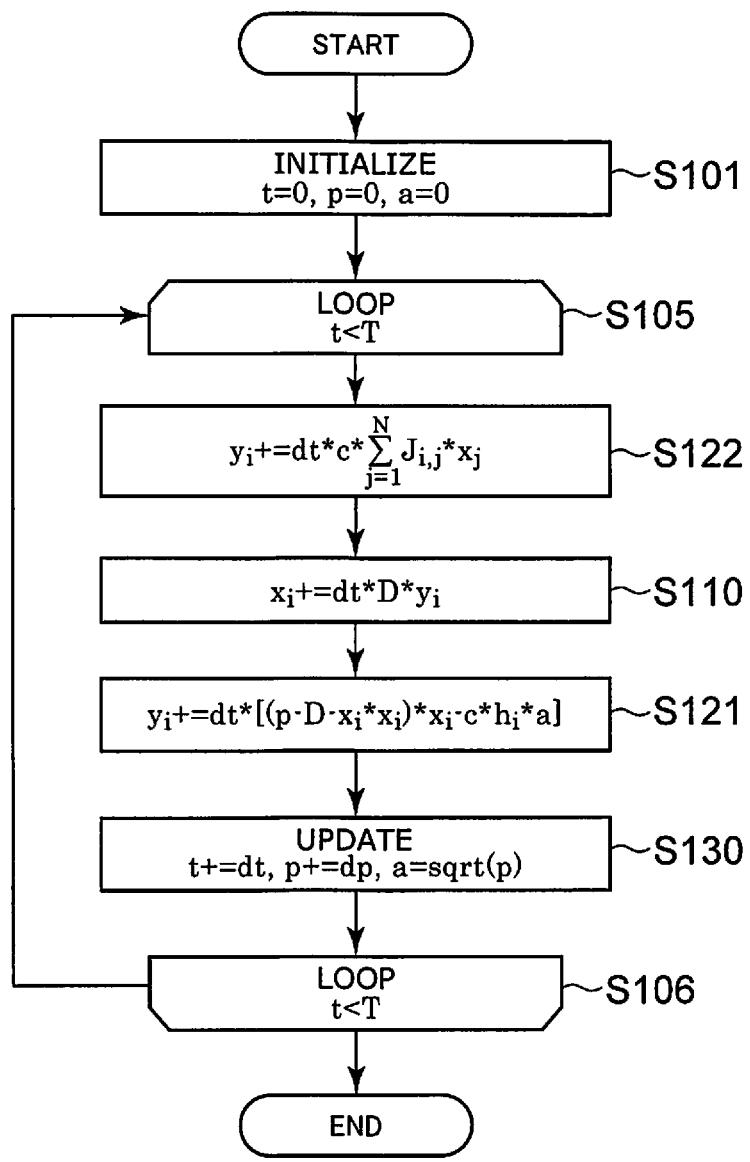
FIG. 26 is a flowchart illustrating operation of the calculating device according to the embodiment.
Figure 27:
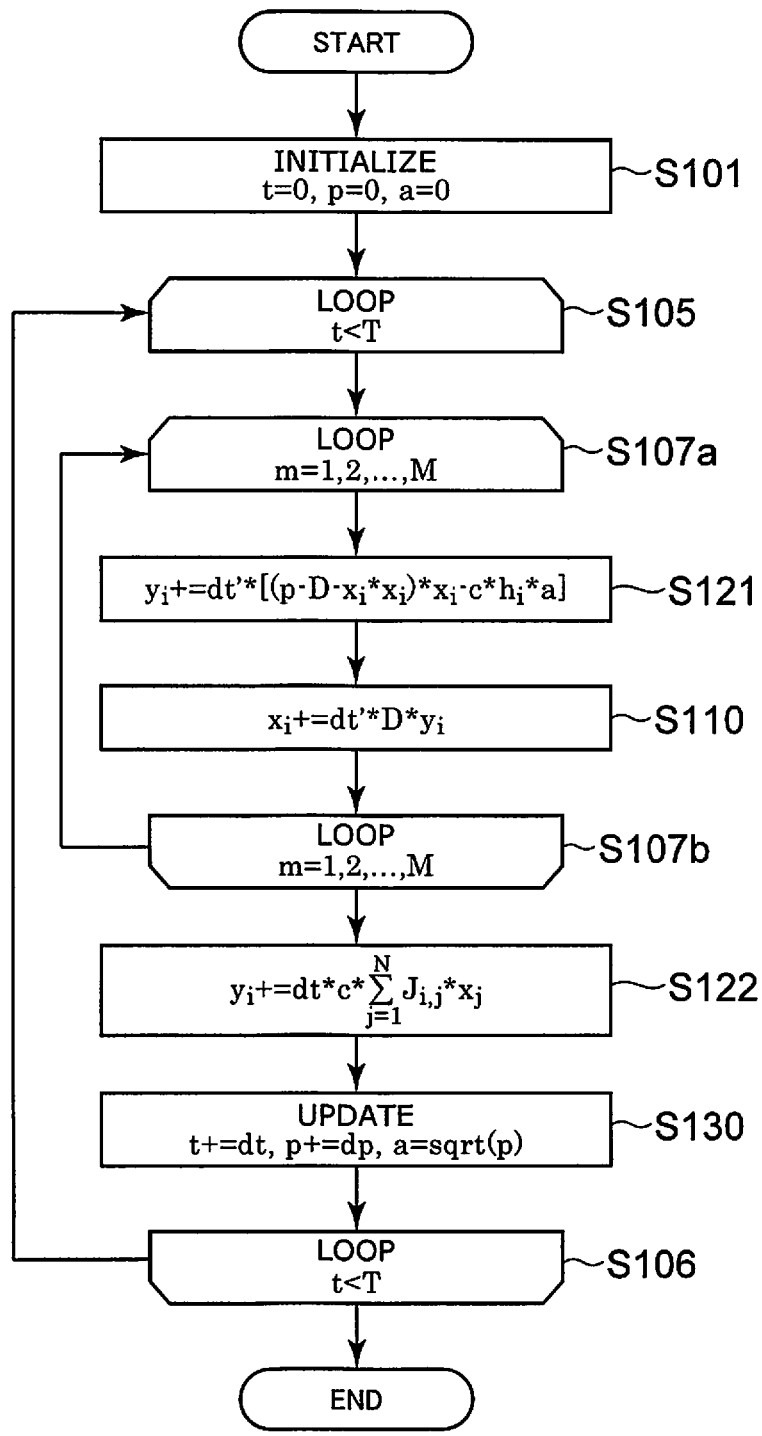
FIG. 27 is a flowchart illustrating operation of the calculating device according to the embodiment.

The calculating device 120 includes, for example, an interface circuit 71 (referring to FIG. 20). The interface circuit 71 includes, for example, at least one of a memory interface, a bus interface, or a serial link. The memory interface includes, for example, at least one of DDR4 or HBM2. The bus interface includes, for example, PCIe, etc.

In one example, for example, the calculating device 120 receives the first parameter group {J} and the initial values of the first variable group {x} and the second variable group {y} via the interface circuit 71. For example, these received values are stored in the storer 10. In one example, the calculating device 120 may include an initial value generation circuit 72 (referring to FIG. 20). The initial value generation circuit 72 includes, for example, a random number generator. In such a case, the initial values of the first variable group {x} and the initial values of the second variable group {y} are generated by the initial value generation circuit 72. The generated values are stored in the storer 10.

The calculating device 120 can output, from the interface circuit 71, the first variable group {x} and the values calculated from the first variable group {x}.

In the example as shown in FIG. 1, the second arithmetic module 22 includes a JX function circuit JXF and a JX update circuit JXU. The output of the first memory 11 and the output of the third memory 13 are input to the JX function circuit JXF. The output of the JX function circuit JXF and the output of the second memory 12 are input to the JX update circuit JXU. The output of the JX update circuit JXU is input to the first arithmetic module 21.

The output of the second arithmetic module 22 corresponds to the output of the JX update circuit JXU. Thus, the output of the second arithmetic module 22 includes the output of the JX update circuit JXU.

In the example as shown in FIG. 1, the first arithmetic module 21 includes one or multiple circuit sets 21A. Multiple circuit sets 21A are provided in the example. In the example, the number of the multiple circuit sets 21A is 2. As described below, the number may be 1 or may be 3 or more.

One circuit set 21A includes a first arithmetic circuit 21a and a second arithmetic circuit 21b. The first arithmetic circuit 21a includes an FX function circuit FXF and an FX update circuit FXU. The second arithmetic circuit 21b includes an FY function circuit FYF and an FY update circuit FYU.

The output of the FX function circuit FXF is input to the FX update circuit FXU. The output of the FX update circuit FXU is input to the FY function circuit FYF. The output of the FY function circuit FYF is input to the FY update circuit FYU. For example, the multiple circuit sets 21A are connected in series.

In the case where the multiple circuit sets 21A are provided, another one (a second stage) of the multiple circuit sets 21A includes another first arithmetic circuit 21a and another second arithmetic circuit 21b. The other first arithmetic circuit 21a includes another FX function circuit FXF and another FX update circuit FXU. The other second arithmetic circuit 21b includes another FY function circuit FYF and another FY update circuit FYU. The output of the other FX function circuit FXF is input to the other FX update circuit FXU. The output of the other FX update circuit FXU is input to the other FY function circuit FYF. The output of the other FY function circuit FYF is input to the other FY update circuit FYU.

The output of the FX update circuit FXU (the first stage) recited above is input to the other FX update circuit FXU (the second stage) recited above. The output of the FY update circuit FYU (the first stage) recited above is input to the other FY update circuit FYU (the second stage) recited above.

The output of the second arithmetic module 22 is input to the FX update circuit FXU (the first stage) recited above. The output of the first memory 11 is input to the FX function circuit FXF (the first stage) recited above and the FY update circuit FYU (the first stage) recited above.

By such a first arithmetic module 21, for example, the first variable update recited above and a second variable update can be performed efficiently. For example, a high-speed update is possible. The values of x from the first memory 11 and the values of y from the second arithmetic module 22 are input to the first arithmetic module 21. The updates of x and y are performed in the first arithmetic module 21. The values of x and y after the updates are output from the first arithmetic module 21.

As shown in FIG. 1, a part of the output of a first arithmetic module 21 is input to the first memory 11. Another part of the output of the first arithmetic module 21 is input to the second memory 12. Thereby, the repetition of the arithmetic (the update) can be performed efficiently.

The number of product-sum operations and the like of one update of the second variable group {y} in the JX module JXM is dependent on $N^2$. On the other hand, the number of product-sum operations of one update of the first variable group {x} and one update of the second variable group {y} in the FXFY module FXFYM is dependent on N.

In the embodiment, a spatial parallelization method mainly is applicable in the JX module JXM. For example, the JX module JXM includes multiple multipliers. Thereby, the JX module JXM can perform two or more products of the elements of 3 and the elements of X in the same clock cycle. The number of clock cycles for performing the JX calculation can be reduced.

On the other hand, in the FXFY module FXFYM, a temporal parallelization method (e.g., pipeline parallelization) mainly is applicable. For example, the multiple circuit sets 21A recited above are provided and connected in series in the FXFY module FXFYM. Thereby, high-speed calculations are performed.

In the embodiment, for example, the operation of the JX module JXM and the operation of the FXFY module FXFYM may be performed to overlap temporally. For example, the output of the JX module JXM is connected to the FXFY module FXFYM; the output of the JX arithmetic is sequentially transmitted to the FXFY module FXFYM; and the arithmetic is performed. At least a part of the JX arithmetic and at least a part of the FXFY arithmetic are performed in parallel. Thereby, even faster calculations are performed.

FIG. 2A, FIG. 2B, FIG. 3A, and FIG. 3B are schematic views showing the calculating device according to the first embodiment.

Figures 2A, 2B:
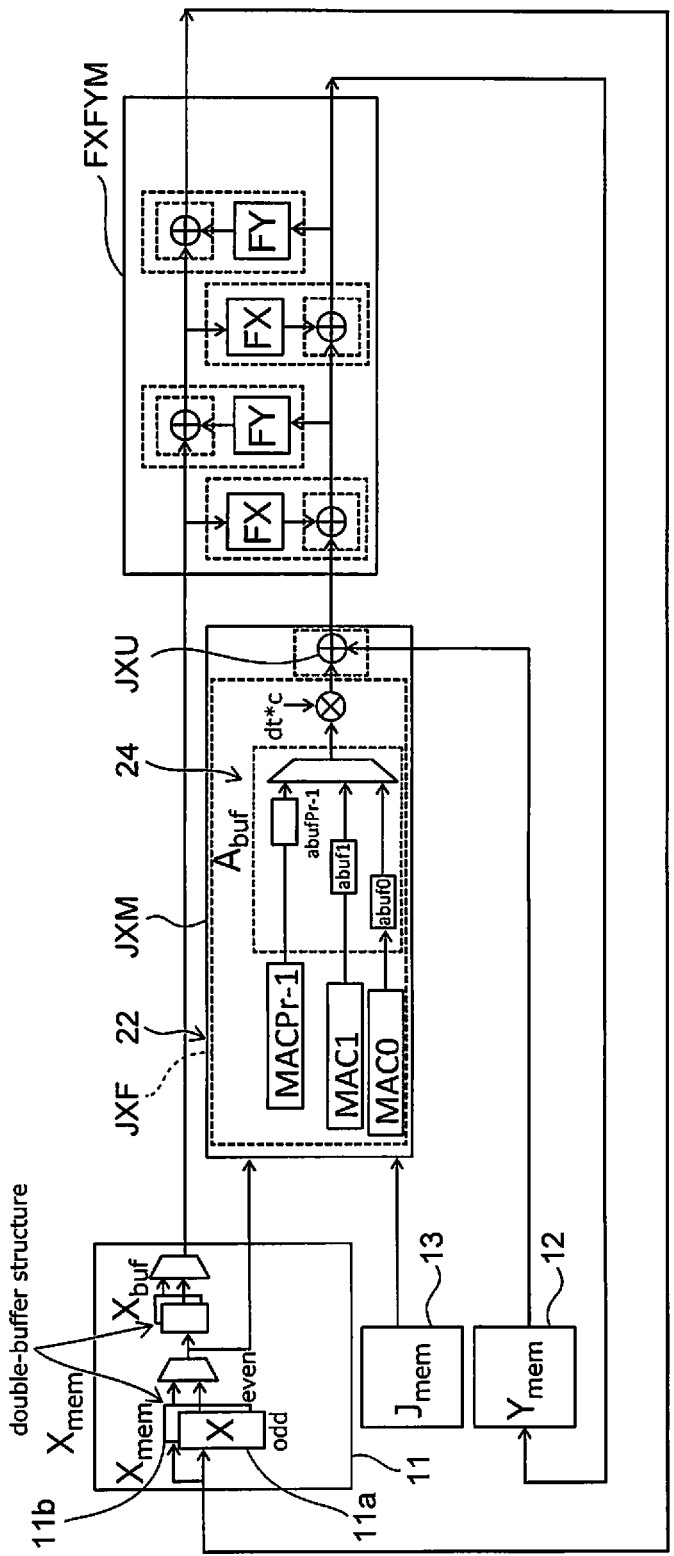
FIG. 2A and FIG. 2B are schematic views showing the calculating device according to the first embodiment.
Figures 3A, 3B:
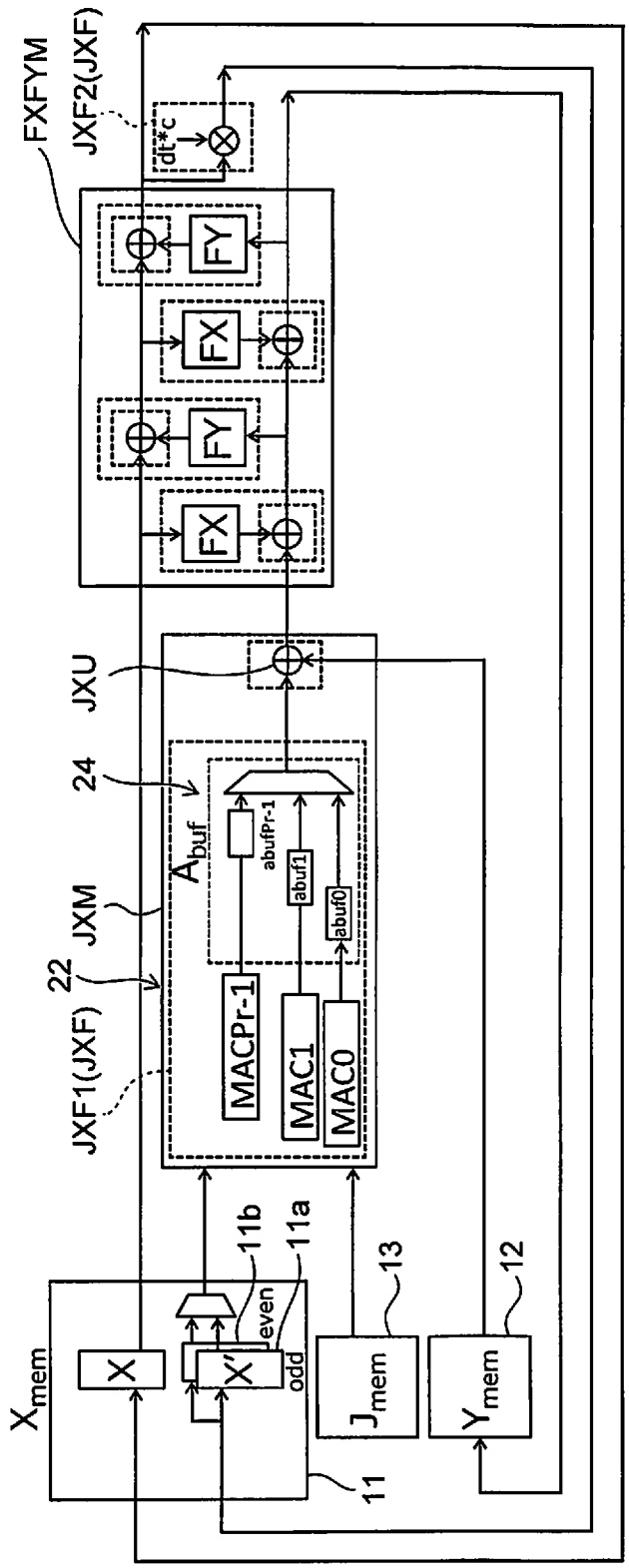
FIG. 3A and FIG. 3B are schematic views showing the calculating device according to the first embodiment.

FIG. 2B illustrates the arithmetic performed by the JX function circuit JXF of the example shown in FIG. 2A. FIG. 3B illustrates the arithmetic performed by the JX function circuit JXF of the example shown in FIG. 3A.

In the example shown in FIG. 3A, a JXF1 circuit and a JFX2 circuit are provided as the JX function circuit JXF. The JFX2 performs the multiplication of dt*c and the input. For example, there are cases where an overflow occurs in the product-sum operation inside the JX module JXM. For example, dt*c can be set to be a number of 1 or less. For example, the overflow can be avoided by performing the product-sum operation after setting xi'=dt*c*xi.

In the calculating device shown in FIG. 2A, FIG. 2B, FIG. 3A, and FIG. 3B, the first memory 11 includes a first memory part 11a and a second memory part 11b. For example, the second memory part 11b can perform a write operation when the first memory part 11a performs a read operation. The first memory part 11a can perform a write operation when the second memory part 11b performs a read operation.

The updates are performed efficiently by such an operation. For example, the even-numbered updates and the odd-numbered updates are performed alternately. The first memory part 11a and the second memory part 11b are separately used respectively in the updates performed alternately. For example, the first memory 11 (e.g., the Xmem memory) has a "double-buffer structure" or a "Ping-Pong buffer structure."

As described below, for example, the second arithmetic module 22 (e.g., the JX module JXM) performs the product-sum operation of N rows×N columns by block division. In the block division, a row degree of parallelism parameter "Pr" and a column degree of parallelism parameter "Pc" are introduced. Pr corresponds to the degree of parallelism of the rows of the matrix J. Pc corresponds to the degree of parallelism of the columns of the matrix J. For example, these parameters (degrees of parallelism) are set in the JX module.

In the example shown in FIG. 2A, the first memory 11 includes an Xbuf circuit. For example, the Xbuf circuit stores at least a part of a vector X. For example, the Xbuf circuit stores Pr entries of the x data.

In the example shown in FIG. 3A, the first memory 11 includes an X memory part. The X memory part stores N entries of the x data.

The second arithmetic module 22 (the JX module JXM) includes, for example, multiple MAC (multiply and accumulation) operation modules (multiply-add accumulation operation modules) and an Abuf circuit (a buffer circuit 24).

An example of the second arithmetic module 22 (the JX module JXM) will now be described.

FIG. 4 to FIG. 6, FIG. 7A to FIG. 7C, FIG. 8A to FIG. 8C, FIG. 9A, FIG. 9B, FIG. 10, FIG. 11A, FIG. 11B, FIG. 12A, and FIG. 12B are schematic views showing the calculating device according to the first embodiment.

Figure 13:
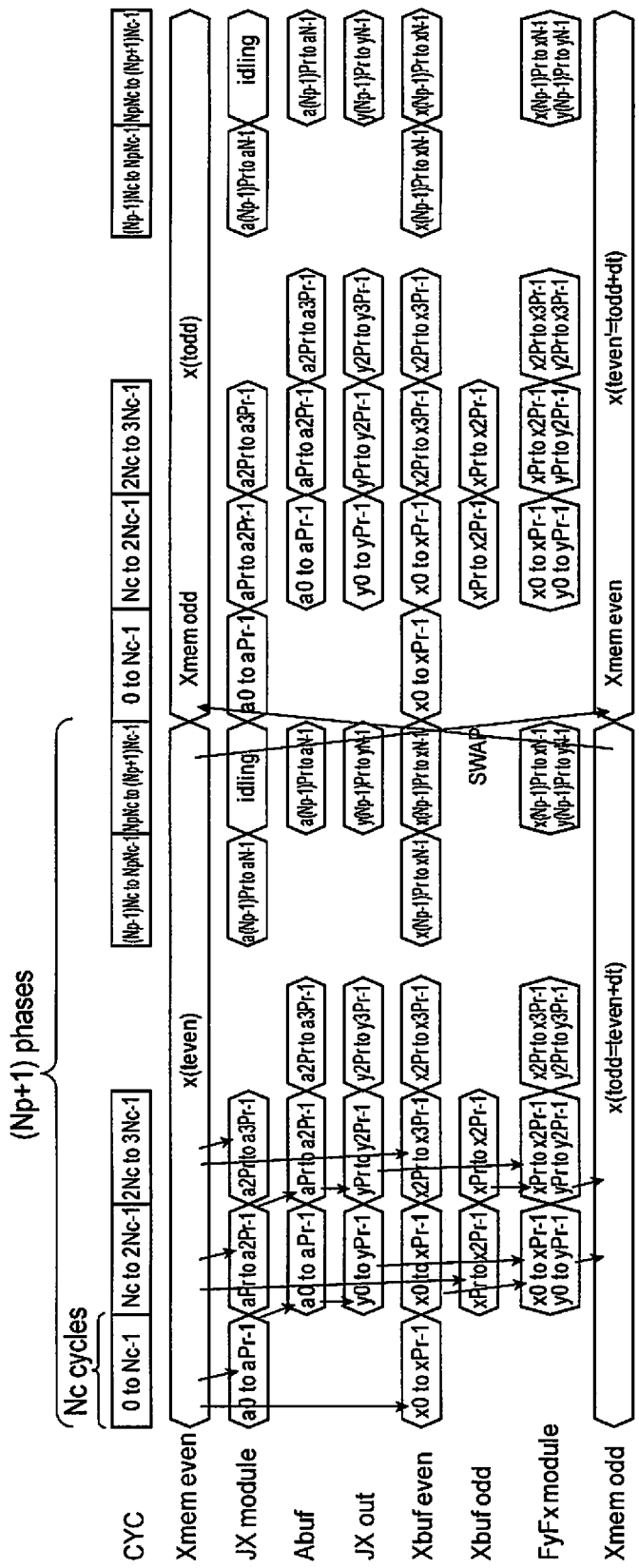
FIG. 13 is a schematic view illustrating operation of the calculating device according to the first embodiment.
Figure 14:
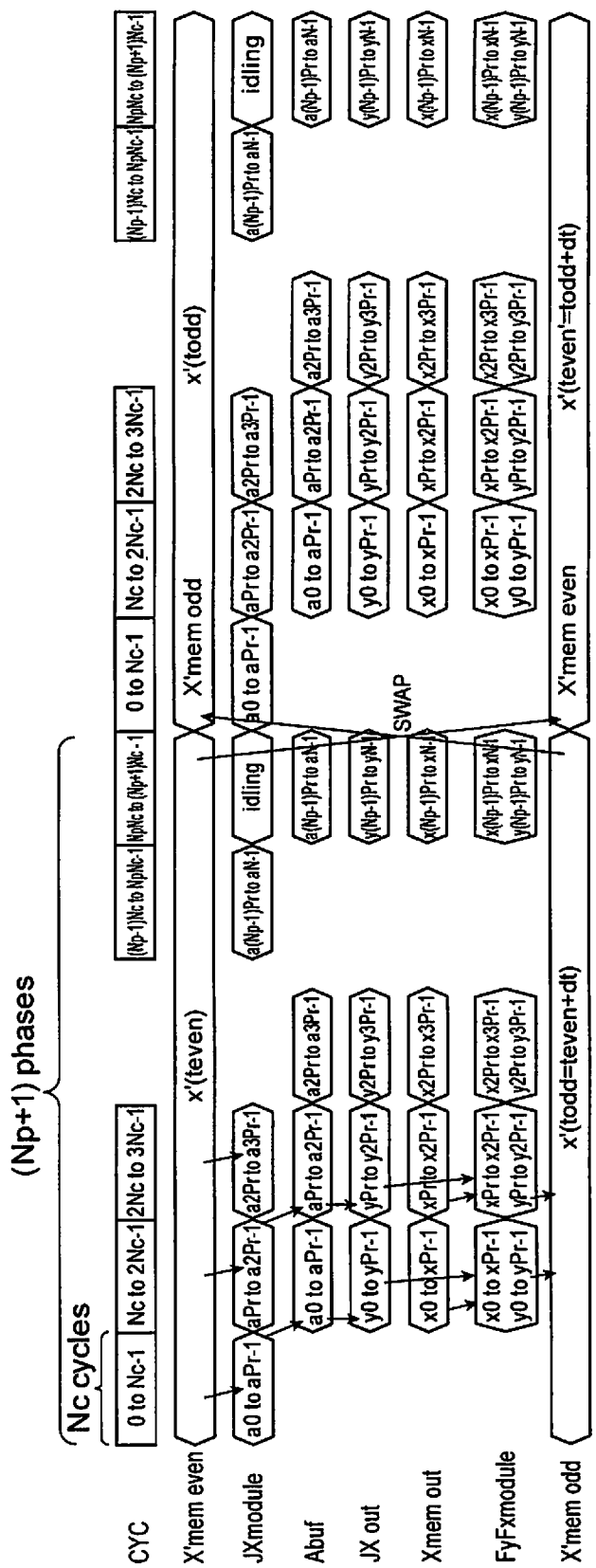
FIG. 14 is a schematic view illustrating operation of the calculating device according to the first embodiment.

FIG. 13 and FIG. 14 are schematic views illustrating operations of the calculating device according to the first embodiment.

FIG. 13 and FIG. 14 correspond to time charts of the example shown in FIG. 2A and FIG. 3A.

Figure 4:
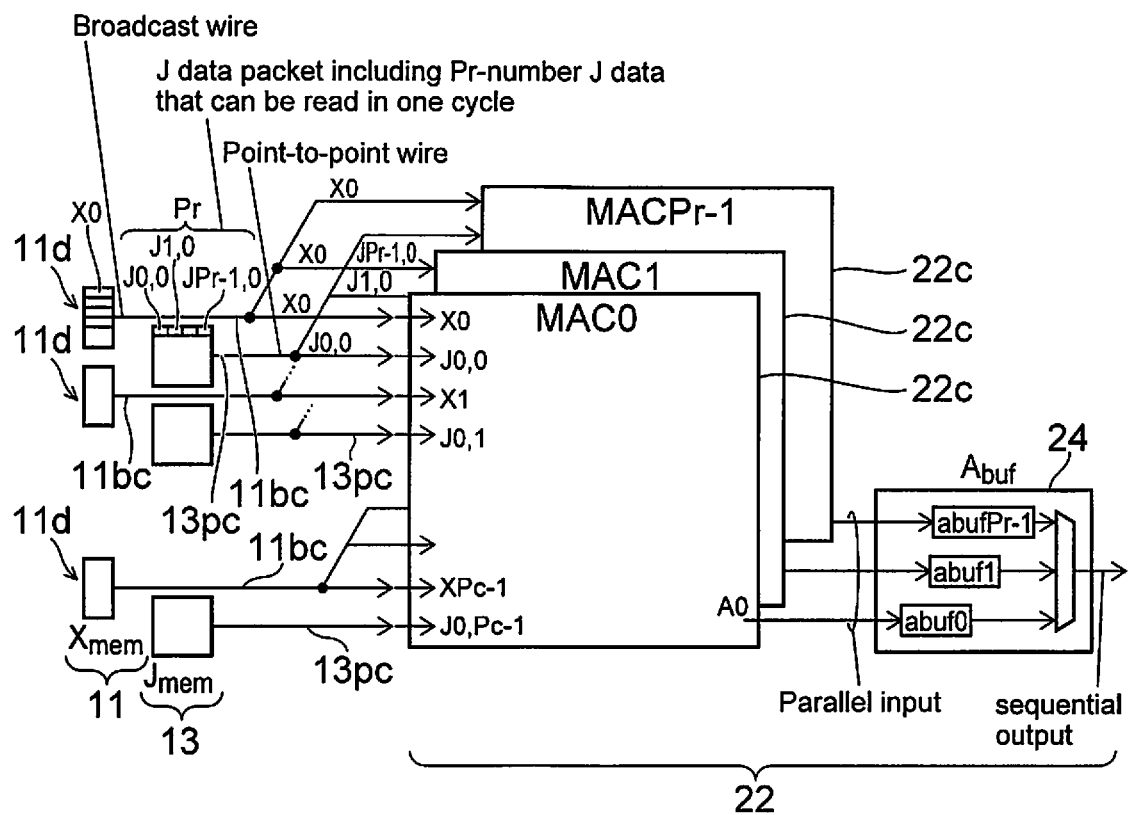
FIG. 4 is a schematic view showing the calculating device according to the first embodiment.
Figure 5:
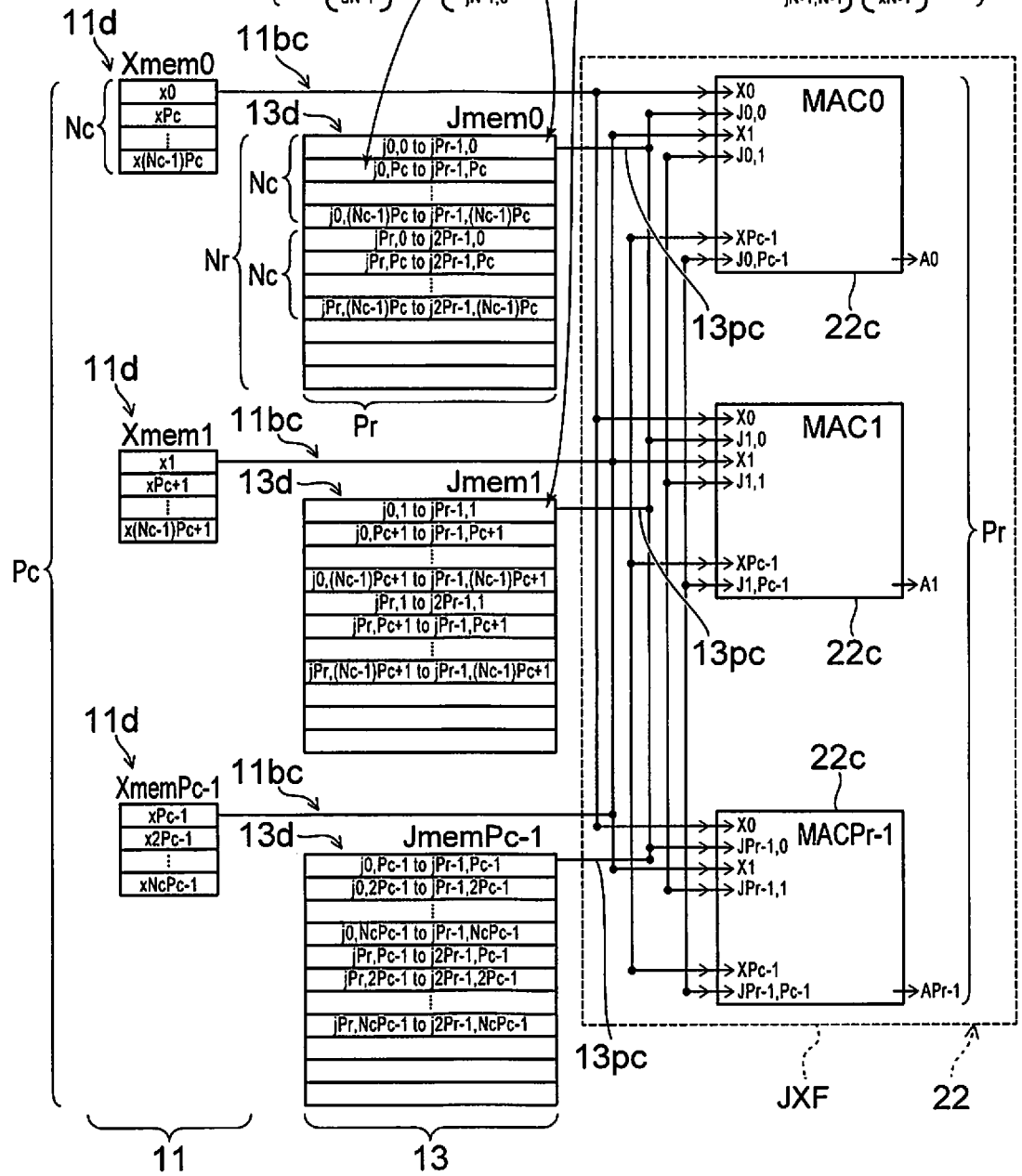
FIG. 5 is a schematic view showing the calculating device according to the first embodiment.

FIG. 4 and FIG. 5 illustrate the JX function circuit JXF included in the JX module JXM. As shown in FIG. 4, the JX module JXM includes Pr MAC operation modules (the operation modules MAC0 to MACPr-1). One of the MAC operation modules includes Pc multipliers. The multiplications are performed Pc times in one cycle. The JX module JXM performs the inner product of one JBlock (described below) and one XBlock (described below) in one cycle. The inner product corresponds to the multiplications performed Pr×Pc times.

As described above, for example, the second arithmetic module 22 (e.g., the JX module JXM) performs the product-sum operation of N rows×N columns by block division.

As shown in FIG. 5, the matrix J that has N rows×N columns is partitioned into Nr entries (Nr=N/Pr) in the row direction. The matrix J is partitioned into Nc entries (Nc=N/Pc) in the column direction. One of the multiple blocks includes Pr rows and Pc columns. Each of the multiple partitioned blocks is referred to as the JBlockij (i being an integer not less than 0 and not more than (Nr–1), and j being an integer not less than 0 and not more than (Nc–1)). The N×1 X matrix is partitioned into Nc entries in the row direction. One of the multiple blocks includes Pc rows. Each of the multiple partitioned blocks of the X matrix is referred to as the XBlocki (i being an integer not less than 1 and not more than (Nc–1)).

The "A matrix" is a matrix having N rows and 1 column. The matrix is obtained by the result of the matrix multiplication of the J matrix and the X matrix. The "N×1 A matrix" is partitioned into Nr entries in the row direction. One of the multiple blocks includes Pr rows. Each of the multiple partitioned blocks of the "A matrix" is referred to as the ABlocki (i being an integer not less than 1 and not more than (Nr–1)).

For example, as shown in FIG. 5, the first memory 11 (the Xmem memory) includes Pc parts (the memory blocks Xmem0 to XmemPc-1). The third memory 13 (the Jmem memory) includes Pc parts (the memory blocks Jmem0 to JmemPc-1).

In the JX module JXM as shown in FIG. 13, the (0,0), (0,1), . . . , (0,Nc–1) JBlocks and the (0), (1), . . . , (Nc–1) XBlocks are sequentially input in each cycle inside the interval of the 0 to Nc–1 cycles (the zeroth phase). The Pr MAC operation modules perform the parallel output in one cycle of the data of the (0) ABlock after the final cycle of the zeroth phase. The data of the (0) ABlock is stored in the circuit ABuf (referring to FIG. 4). In the interval of the next first phase, the Abuf circuit stores the (0) ABlock; and the elements of the ABlock can be output sequentially. Subsequently, the (1,0), (1,1), . . . , (1,Nc–1) JBlocks and the (0), (1), . . . , (Nc–1) XBlocks corresponding to the next block column are sequentially input inside the interval of the Nc to 2Nc–1 cycles (the first phase). The Pr MAC operation modules perform the parallel output in one cycle of the data of the (1) ABlock after the final cycle of the first phase. The data of the (1) ABlock is stored in the Abuf circuit.

For example, Pc entries of x data and Pc×Pr entries of J data are supplied to the JX module JXM for each cycle. The Pc entries of the x data are included in the first variable group {x}. The j data is included in the first parameter group {j}.

As described above, the Xmem memory is partitioned into Pc memory blocks (the memory blocks Xmem0 to XmemPc−1) (referring to FIG. 5). Thereby, it is possible to perform the "read" Pc times in one cycle. For example, the word length (the width) of each of the Pc memory blocks is not less than the data bit width of the x data. The word count (the depth) of each of the Pc memory blocks is not less than Nc. Each of the Pc memory blocks includes 1 write and 1 read port.

Each of the Pc memory blocks (the memory blocks Xmem0 to XmemPc−1) may include one physical memory block. Each of the Pc memory blocks may include multiple physical memory blocks. The multiple physical memory blocks are logically combined with each other.

The corresponding data is stored in each of the Pc memory blocks (the memory blocks Xmem0 to XmemPc−1). For example, the data of the zeroth row of the XBlock is stored in the memory block Xmem0. The data of the zeroth row of the XBlock includes, for example, the data "x0" of the zeroth matrix of the XBlock (0) and the data "xPc" of the zeroth matrix of the XBlock (1). For example, the data of the first row of the XBlock is stored in the memory block Xmem1. The data of the first row of the XBlock includes, for example, the data "x1" of the first matrix of the XBlock (0) and the data "xPc+1" of the first matrix of the XBlock (1).

The "read access pattern" to the Pc memory blocks (the memory blocks Xmem0 to XmemPc−1) is sequential access. In sequential access, the "read addr" is incremented one at a time from 0 to (Nc−1). Thereby, for example, a complex address operation is unnecessary.

As described above, the Jmem memory is partitioned into Pc memory blocks (the memory blocks Jmem0 to JmemPc−1) (referring to FIG. 5). Pc×Pr entries of the j data can be supplied to one cycle. The word length (the width) of each of the Pc memory blocks is set to be not less than the data width corresponding to the j data packet (referring to FIG. 4). The j data packet includes Pr entries of the j data. For example, in the case of 1 bit of the j data, the j data packet is Pr bits. For example, in the case of 32 bits of the j data, the j data packet is Pr×32 bits. The "read" of one J data packet can be performed in one cycle for each of the Pc memory blocks. The word count (the depth) of each of the Pc memory blocks is Nc×Nr.

The corresponding data is stored in each of the Pc memory blocks (the memory blocks Jmem0 to JmemPc−1). For example, the data of the zeroth column of the JBlock is stored as the j data packet in the memory block Jmem0. For example, the data "j0,0 to jPr−1,0" of the zeroth column of the JBlock (0,0) is stored as the j data packet (0). For example, the data "j0,Pc to jPr−1,Pc" of the zeroth column of the JBlock (0,1) is stored as the j data packet (1). For example, the data of the first column of the JBlock is stored as the j data packet in the memory block Jmem1. For example, the data "j0,1 to jPr−1,1" of the first column of the JBlock (0,0) is stored as the j data packet (0). For example, the data "j0,Pc+1 to jPr−1,Pc+1" of the first column of the JBlock (0,1) is stored as the j data packet (1).

The "read access pattern" to the Pc memory blocks (the memory blocks Jmem0 to JmemPc−1) is sequential access. In sequential access, the "read addr" is incremented one at a time from 0 to NrNc−1. Thereby, a complex address operation is unnecessary.

FIG. 4 shows an example of the connection wiring of the JX module JXM, the Xmem memory, the Jmem memory, and the Abuf circuit.

One of the Pc memory blocks (the memory blocks Xmem0 to XmemPc−1: referring to FIG. 5) included in the Xmem memory is connected by a "broadcast wire" to the Pr MAC operation modules (the MAC operation modules MAC0 to MACPr−1). For example, the x0 data that is read from the memory block Xmem0 is supplied to all of the Pr MAC operation modules.

On the other hand, one of the Pc memory blocks (the memory blocks Jmem0 to JmemPc−1: referring to FIG. 5) included in the Jmem memory is connected to the Pr MAC operation modules (the MAC operation modules MAC0 to MACPr−1) by "point-to-point wires." For example, the j data packet (0) that is read from the memory block Jmem0 is divided by "wire connectivity." The j data packet (0) includes J0,0 to jPr−1,0. For example, the J0,0 data is transferred to the MAC operation module MAC0. For example, the J1,0 data is transferred to the MAC operation module MAC1. For example, the jPr−1,0 data is transferred to the MAC operation module MACPr−1.

Thus, the calculating device 120 may further include multiple first wires 11*bc* and multiple second wires 13*pc* (referring to FIG. 4 and FIG. 5). For example, the first parameter group {J} includes the N×N matrix (N being an integer of 2 or more). The row degree of parallelism parameter "Pr" and the column degree of parallelism parameter "Pc" are set in the second arithmetic module 22 (the JX module JXM).

The second arithmetic module 22 (the JX module JXM) includes Pr multiply-accumulate modules 22*c* (referring to FIG. 4 and FIG. 5). Pr is an integer not less than 2 and not more than N, and is a divisor of N. The Pr multiply-accumulate modules 22*c* correspond respectively to the Pr MAC operation modules (the MAC operation modules MAC0 to MACPr−1). For example, one of the Pr multiply-accumulate modules 22*c* includes Pc multipliers (described below) (Pc being an integer not less than 2 and not more than N and being a divisor of N).

The first memory 11 (the Xmem memory) includes Pc first memory blocks 11*d* (the memory blocks Xmem0 to XmemPc−1) which are the first memory 11 partitioned into Pc memory blocks. The third memory 13 (the Jmem memory) includes Pc third memory blocks 13*d* (the memory blocks Jmem0 to JmemPc−1) which are the third memory 13 partitioned into Pc memory blocks.

As shown in FIG. 4 and FIG. 5, one of the multiple first wires 11*bc* connects one of the Pc first memory blocks 11*d* and all of the Pr multiply-accumulate modules 22*c*. Another one of the multiple first wires 11*bc* connects another one of the Pc first memory blocks 11*d* and all of the Pr multiply-accumulate modules 22*c*. Yet another one of the multiple first wires 11*bc* connects another one of the Pc first memory blocks 11*d* and all of the Pr multiply-accumulate modules 22*c*. For example, the connections are performed by broadcast wires.

On the other hand, one of the multiple second wires 13*pc* connects one of the Pc third memory blocks 13*d* and one of the Pr multiply-accumulate modules 22*c*. For example, the connection is performed by a point-to-point wire.

Figure 6:
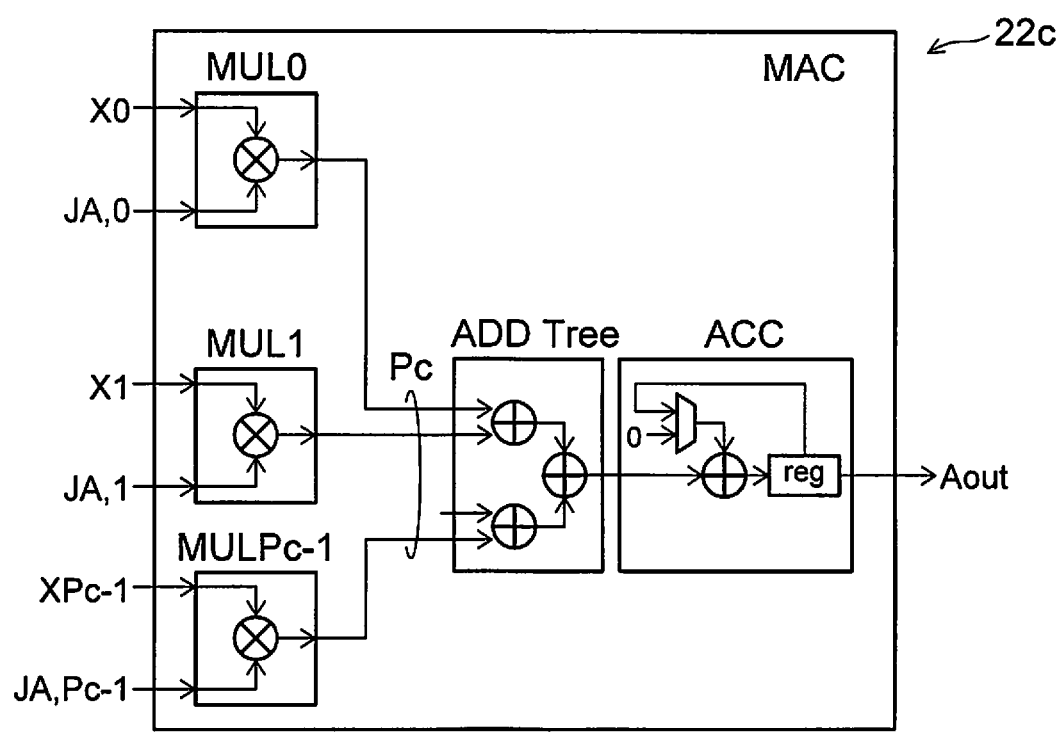
FIG. 6 is a schematic view showing the calculating device according to the first embodiment.

FIG. 6 shows an example of the MAC operation module.

As shown in FIG. 6, one multiply-accumulate module 22*c* (the MAC operation module) includes Pc multipliers MUL (the multipliers MUL0 to MULPc−1). Further, a "Pc-to-1" adder tree ADDtree (an "add tree") and an accumulator ACC are provided. The multiplication of one of the first variable group {x} (the first variable xi or the like) and one of the first parameter group {J} (the first parameter $J_{i,j}$ or the like) is performed in each of the Pc multipliers MUL. The result of the multiplication is output to the adder tree ADDtree. The output of the adder tree ADtree is supplied to the accumulator ACC. An output Aout is output from the accumulator ACC.

Figure 7A:
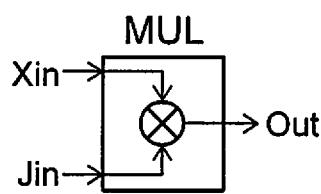
FIG. 7A to FIG. 7C are schematic views showing the calculating device according to the first embodiment.
Figure 7B:
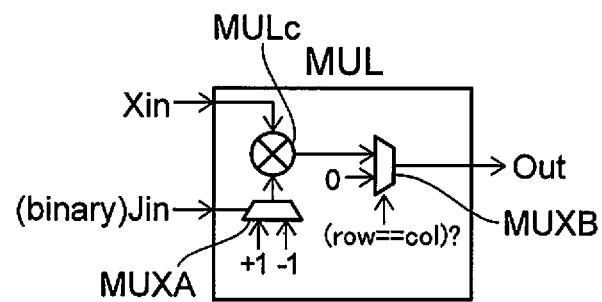
Figure 7C:
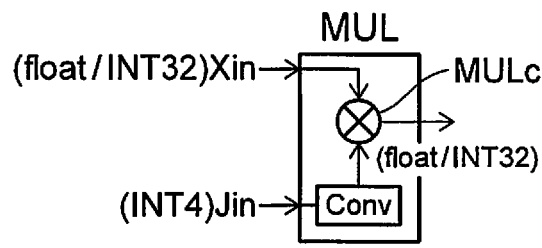

FIG. 7A to FIG. 7C show several examples of the multiplier MUL.

In one example as shown in FIG. 7A, the multiplier MUL includes a fixed-point multiplier or a floating-point multiplier. For example, this configuration is used when both Xin and Jin are an "INT" (a signed fixed-point) representation or a "Float" (signed floating-point) representation.

In one example as shown in FIG. 7B, the multiplier MUL includes one multiplier MULc and two 2-to-1 multiplexers (multiplexers MUXA and MUCB). For example, this configuration is used when the elements of matrix J are the two values of −1 or +1. In such a case, the two values of −1 or +1 are encoded into the bit of 0 or 1. The multiplier MUL of the example shown in FIG. 7B has the function of a multiplier and the function of a decoder.

For example, Jin is connected to the control terminal of the 2-to-1 multiplexer (the multiplexer MUXA). The constant of −1 or +1 is input to the multiplexer MUXA. The value of −1 or +1 is output according to Jin.

The diagonal elements of the matrix J are 0. The output of the multiplier MULc and the constant 0 are input to the 2-to-1 multiplexer (the multiplexer MUXB). The zero element determination flag "(row==col)?" is supplied from the control circuit 40 (Control Logic: referring to FIG. 1) to the control terminal of the multiplexer MUXB. For the diagonal elements of the matrix J, 0 is output from the output terminal of the multiplexer MUXB regardless of the value of Jin.

In the case where the elements of matrix' J are −1 or +1, the data of the matrix J is three values considering the diagonal elements (i.e., 0). Therefore, two bits can be used to store the data of the matrix J. On the other hand, the multiplier-with-decoder is used in the configuration illustrated in FIG. 7B. In such a case, the data of the matrix J can be expressed by 1 bit. Thereby, for example, the capacity of the on-chip memory for the Jmem memory can be small.

In the embodiment, in the case where the problem to be solved is smaller than the maximum size (N) of the problem that can be handled by the hardware (Nprblm: Nprblm<N), the following can be performed. The problem to be solved is set using j0,0 to jNprblm−1,Nprblm−1 of the J matrix; and 0 is set in the region where row>=Nprblm and col>=Nprblm.

In the case of the multiplier MUL shown in FIG. 7B, it is sufficient to set the zero element determination flag of the multiplexer MUXB to be "(row==col)||(row>=Nprblm)||(col>=Nprblm)." For example, 0 is output from the multiplexer MUXB for the region of row>=Nprblm and col>=Nprblm.

In one example as shown in FIG. 7C, the multiplier MUL includes one multiplier MULc and one data type converter ("conv"). For example, the configuration of the example shown in FIG. 7C is used when the data type of Xin and the data type of Jin are different from each other. For example, the data type converter ("conv") is provided on the Jin input side when Xin is "float (/INT32)" and Jin is "INT4." For example, the data type of "INT4" is converted into the data type of "float (/INT32)" in the data type converter. For example, the conversion between multiple data having fixed-point representations can be performed by a bit shifter. The calculation accuracy is dependent on the data representation of the x data. On the other hand, the bit count (e.g., the data type) of Jin is determined by the properties of the object problem (the problem to be solved); and a high bit precision is not always necessary.

By using the configuration illustrated in FIG. 7C (e.g., the multiplier-with-data type converter), for example, the data types of the J data can be reduced while maintaining high calculation accuracy. For example, the capacity of the on-chip memory for the Jmem memory can be reduced.

Thus, in the embodiment, the JX module JXM (the second arithmetic module 22) includes the Pr multiply-accumulate modules 22c. At least one of the multiply-accumulate modules 22c may include at least one of a multiplier including a decoder or a multiplier including a data type converter.

In the embodiment, for example, the IX module JXM calculates and outputs the ABlock including the Pr entries of "Adata" by using Nc cycles. By repeating this operation Nr times, the Jx module generates N (i.e., Pr×Nr) A matrixes. By using the JX module JXM, for example, the matrix multiplication operation of the first parameter group {J} and the first variable group {x} can be performed Pr×Pc times faster compared to the calculation speed in the case where the degree of parallelism is 1. When the degree of parallelism is 1, Pr=Pc=1.

FIG. 8A to FIG. 8C, FIG. 9A, FIG. 9B, FIG. 10, FIG. 11A, FIG. 11B, FIG. 12A, and FIG. 12B show examples of the FXFY module FXFYM. As described above, the FXFY module FXFYM (the first arithmetic module 21) includes one or multiple circuit sets 21A.

A number M of the circuit sets 21A is 1 in FIG. 8A to FIG. 8C. In the example shown in FIG. 8A, Xin is input to the FX function circuit FXF. Yin and the output of the FX function circuit FXF are input to the FX update circuit FXU. The FX update circuit FXU outputs Yout. Yin is input to the FY function circuit FYF. Xin and the output of the FY function circuit FYF are input to the FY update circuit FYU. The FY update circuit FYU outputs Yout. The FY function circuit FYF and the FX function circuit FXF perform the arithmetic shown in FIG. 8B. The circuit shown in FIG. 8A performs the arithmetic shown in FIG. 8C.

Figures 9A, 9B:
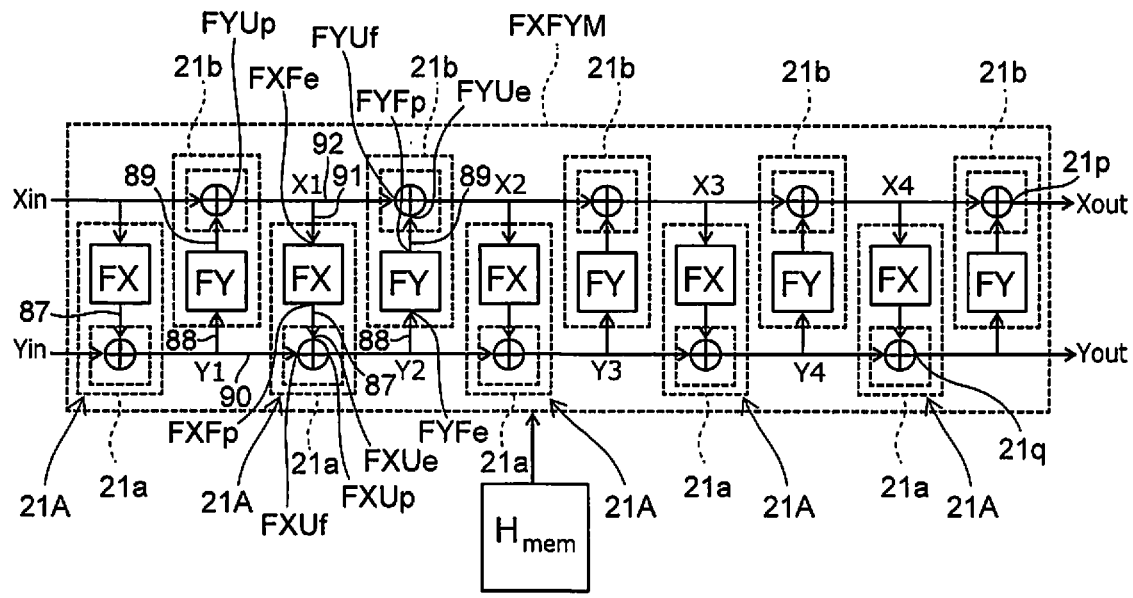
FIG. 9A and FIG. 9B are schematic views showing the calculating device according to the first embodiment.

In FIG. 9A and FIG. 9B, the number M of the circuit sets 21A is 5. The relationship between the multiple internal nodes (x1 to x4 and y1 to y4) and the input/output terminals (Xin, Yin, Xout, and Yout) in FIG. 9A is the state shown in FIG. 9B. Five circuit sets 21A are connected in series (sequential). Multiple updates can be performed by the sequential circuit.

Figure 10:
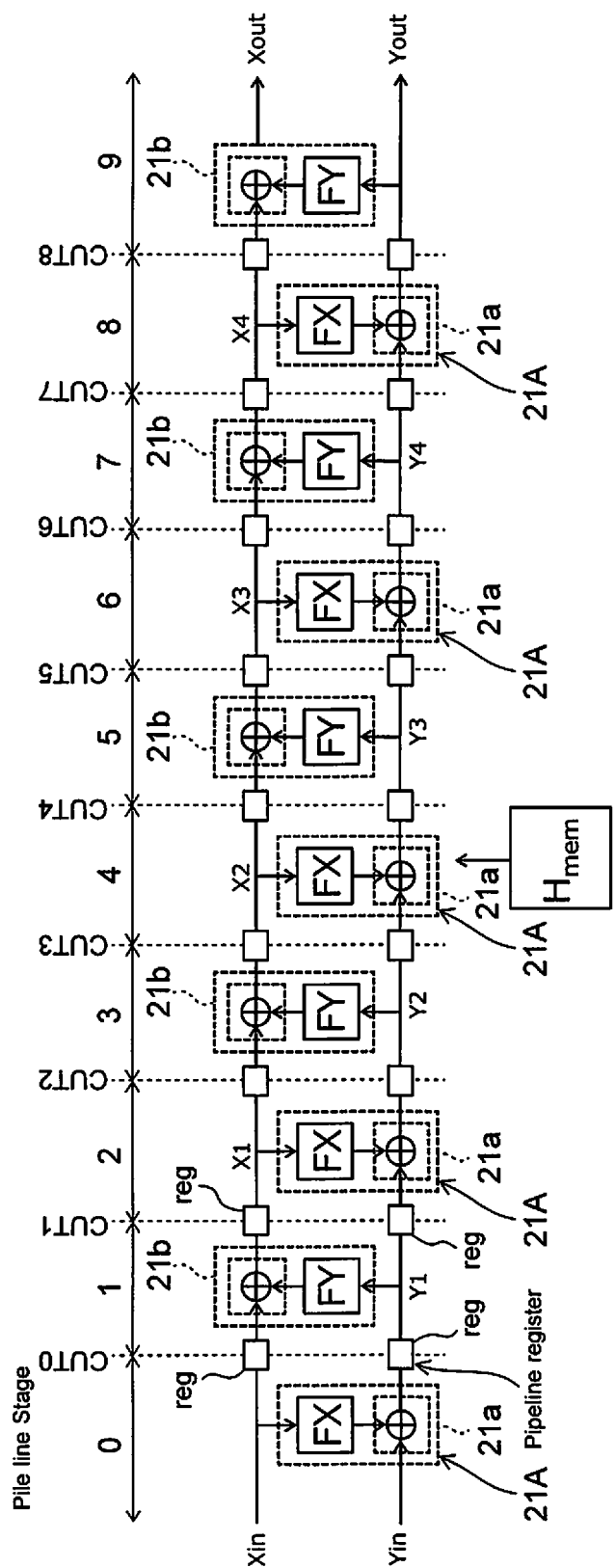
FIG. 10 is a schematic view showing the calculating device according to the first embodiment.

In FIG. 10, the number M of the circuit sets 21A is 5. In FIG. 10, pipeline registers (registers reg) are provided between the multiple processing units (the pipeline stages). For example, the throughput of the FXFY module FXFYM can be improved. Eighteen pipeline registers are inserted into the example of FIG. 10. The FXFY arithmetic is partitioned into ten pipeline stages by CUT0 to CUT8. In the example, the FXFY module FXFYM includes ten stages of pipeline stages connected in series. By pipelining, for example, the operation frequency can be increased. For example, the temporal hardware utilization efficiency can be increased. The throughput can be improved.

Figures 11A, 11B:
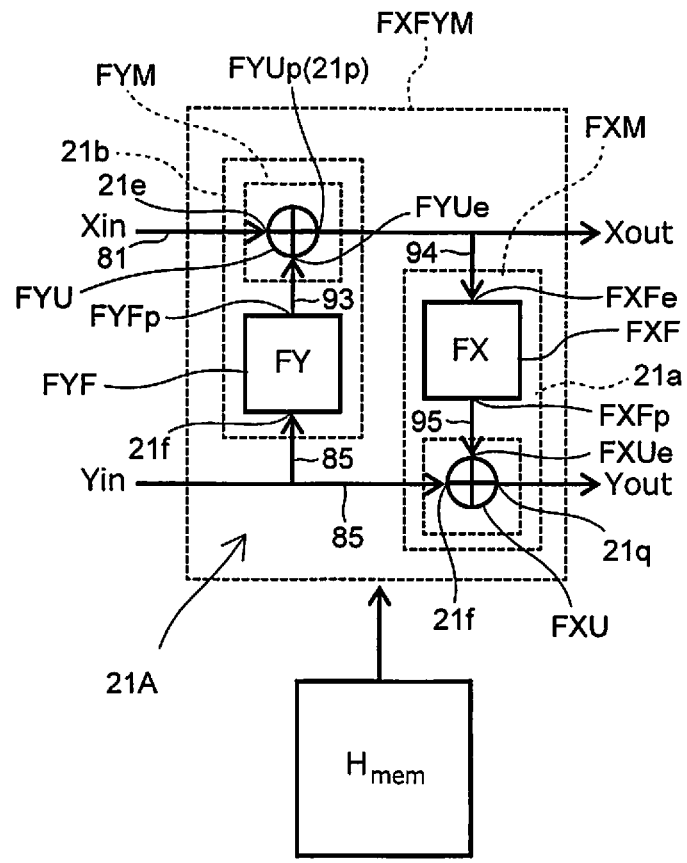
FIG. 11A and FIG. 11B are schematic views showing the calculating device according to the first embodiment.

In FIG. 11A and FIG. 11B, the number M of the circuit sets 21A is 1. In the example shown in FIG. 11A, Yin is input to the FY function circuit FYF. Xin and the output of the FY function circuit FYF are input to the FY update circuit FYU. The FY update circuit FYU outputs Xout. The output of the FY update circuit FYU is input to the FX function circuit FXF. Yin and the output of the FX function circuit FXF are input to the FX update circuit FXU. The FX update circuit FXU outputs Yout. For example, the FX function circuit FXF and the FY function circuit FYF perform the arithmetic shown in FIG. 8B. The circuit shown in FIG. 11A performs the arithmetic shown in FIG. 11B.

Figures 12A, 12B:
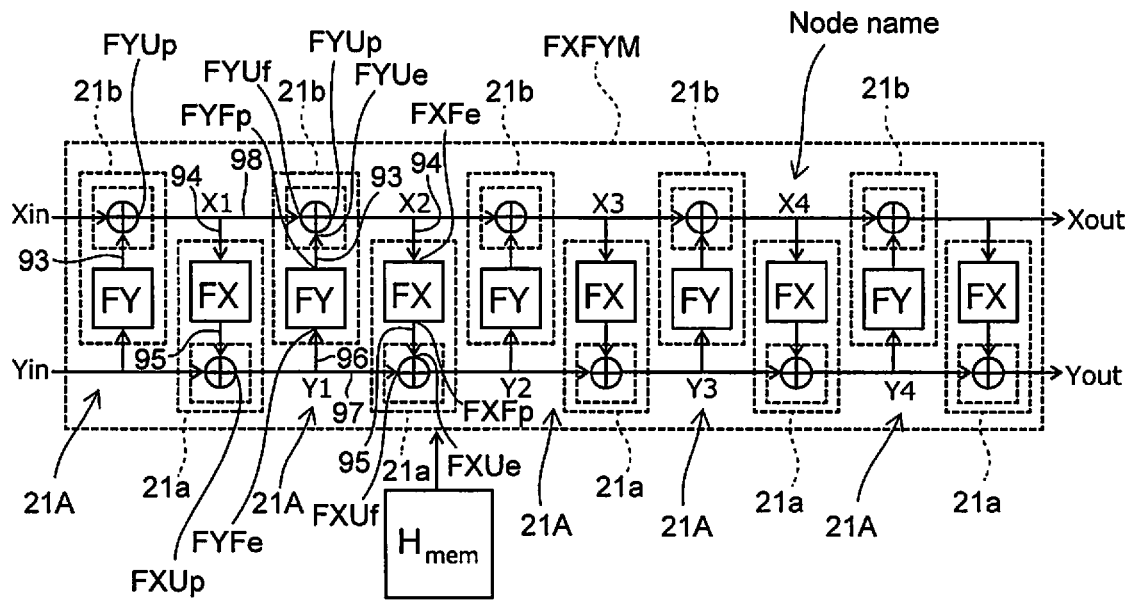
FIG. 12A and FIG. 12B are schematic views showing the calculating device according to the first embodiment.

In FIG. 12A and FIG. 12B, the number M of the circuit sets 21A is 5. The relationship between the multiple internal nodes (x1 to x4 and y1 to y4) and the input/output terminals (Xin, Yin, Xout, and Yout) in FIG. 12A is the state shown in FIG. 12B. The five circuit sets 21A are connected in series (sequential). The multiple updates can be performed by the sequential circuit.

In the example shown in FIG. 11A, FIG. 11B, FIG. 12A, and FIG. 12B as well, the first arithmetic module 21 includes one or multiple circuit sets 21A. The circuit set 21A includes the first arithmetic circuit 21a and the second arithmetic circuit 21b. The first arithmetic circuit 21a includes the FX function circuit FXF and the FX update circuit FXU. The second arithmetic circuit 21b includes the FY function circuit FYF and the FY update circuit FYU. The output of the FY function circuit FYF is input to the FY update circuit FYU. The output of the FY update circuit FYU is input to the FX function circuit FXF. The output of the FX function circuit FXF is input to the FX update circuit FXU.

For example, the following is used in the case where the multiple circuit sets 21A are provided. Another one of the multiple circuit sets 21A includes another first arithmetic circuit 21a and another second arithmetic circuit 21b. The other first arithmetic circuit 21a includes another FX function circuit FXF and another FX update circuit FXU. The other second arithmetic circuit 21b includes another FY function circuit FYF and another FY update circuit FYU. The output of the other FY function circuit FYF recited above is input to the other FY update circuit FYU recited above. The output of the other FY update circuit FYU recited above is input to the other FX function circuit FXF recited above. The output of the other FX function circuit FXF recited above is input to the other FX update circuit FXU recited above. The output of the FY update circuit FYU (the first stage) recited above is input to the other FY update circuit FYU recited above. The output of the FX update circuit FXU (the first stage) recited above is input to the other FX update circuit FXU (the first stage) recited above.

The output of the second arithmetic module 22 is input to the FY function circuit FYF (the first stage) recited above and the FX update circuit FXU (the first stage) recited above. The output of the first memory 11 is input to the FY update circuit FYU (the first stage) recited above.

Figure 28:
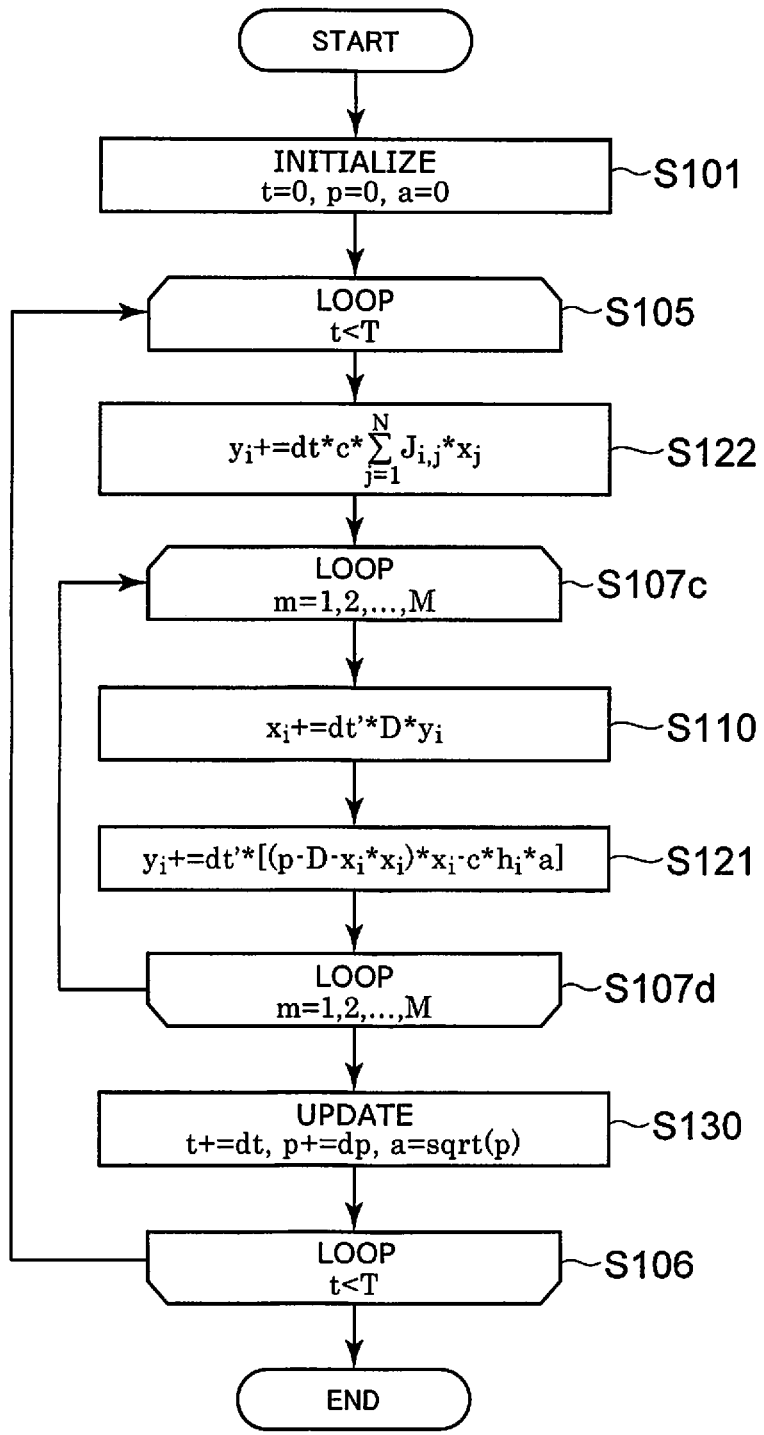
FIG. 28 is a flowchart illustrating operation of the calculating device according to the embodiment.

For example, the arithmetic illustrated in FIG. 28 is performed in the examples shown in FIG. 11A, FIG. 11B, FIG. 12A, and FIG. 12B.

For example, the FXFY module FXFYM performs the arithmetic of Pr data within Nc cycles. Thereby, the stall of the operation of the JX module JXM is suppressed. The latency of the FXFY module FXFYM is taken as "Lxy." For the condition of "Nc>(Pr+Lxy)," it is sufficient for the number of the FXFY modules FXFYM to be 1. At this time, for example, the arithmetic of Pr data can be performed by one FXFY module FXFYM within the time of Nc cycles. In the case where the condition of "Nc>(Pr+Lxy)" does not hold, for example, FXFY is multiplexed. For example, the level of the multiplex is a degree of parallelism parameter Pxy. Thereby, the stall of the operation of the JX module JXM can be suppressed. For example, the degree of parallelism parameter Pxy is set to the minimum integer satisfying the condition of "Nc>(Pr/Pxy+Lxy)."

As shown in FIG. 13, in one "phase," the Xbuf circuit buffers the data used by the FXFY module FXFYM in the next "phase." The data that is used by the FXFY module FXFYM in the next "phase" is the x data (the XBlock).

In the example shown in FIG. 2A, it is difficult to supply data to both the Jx module and the FXFY module FXFYM from the Xmem memory in the case where the Xmem memory has 1 read port. In such a case, the Xbuf circuit stores the data used by the FXFY module FXFYM in the next "phase" while the JX module JXM is operating. Thereby, the data can be supplied stably to both the JX module and the FXFY module FXFYM.

As described above in reference to FIG. 2A and FIG. 3A, for example, the Xmem memory has a "double-buffer structure" or a "Ping-Pong buffer structure." For example, the roles of the part of the Xmem corresponding to "even" and the part of the Xmem corresponding to "odd" are interchanged between "read" and "write."

For example, in the zeroth loop as shown in FIG. 13 and FIG. 14, "Xmem even" is in the "read" state and "Xmem odd" is in the "write" state. In the first loop, "Xmem odd" is in the "read" state; and "Xmem even" is in the "write" state. In one loop, the x matrix is read Np times. One of Xmem even or Xmem odd is in the "read" state. The one continues to store the value of the x data at the time before starting the loop until the one loop ends.

By using the double buffer structure, the operation of the JX module JXM and the operation of the FXFY module FXFYM overlap as shown in FIG. 13. Thereby, a higher speed is possible.

In one example, mainly a spatial parallelization method is applied in the JX module JXM. The speed of the JX module JXM is Pr×Pc times faster.

In one example, a "double-buffer structure" is applied to the Xmem memory. For example, the first memory part 11a and the second memory part 11b are provided in the first memory 11. For example, the JX module JXM and the FXFY module FXFYM have overlapping operations. Thereby, the total operation time of the JX module JXM and the FXFY module FXFYM can be short.

According to the embodiment, for example, a calculating device can be provided in which an optimization problem can be calculated quickly.

Second Embodiment

Figure 15:
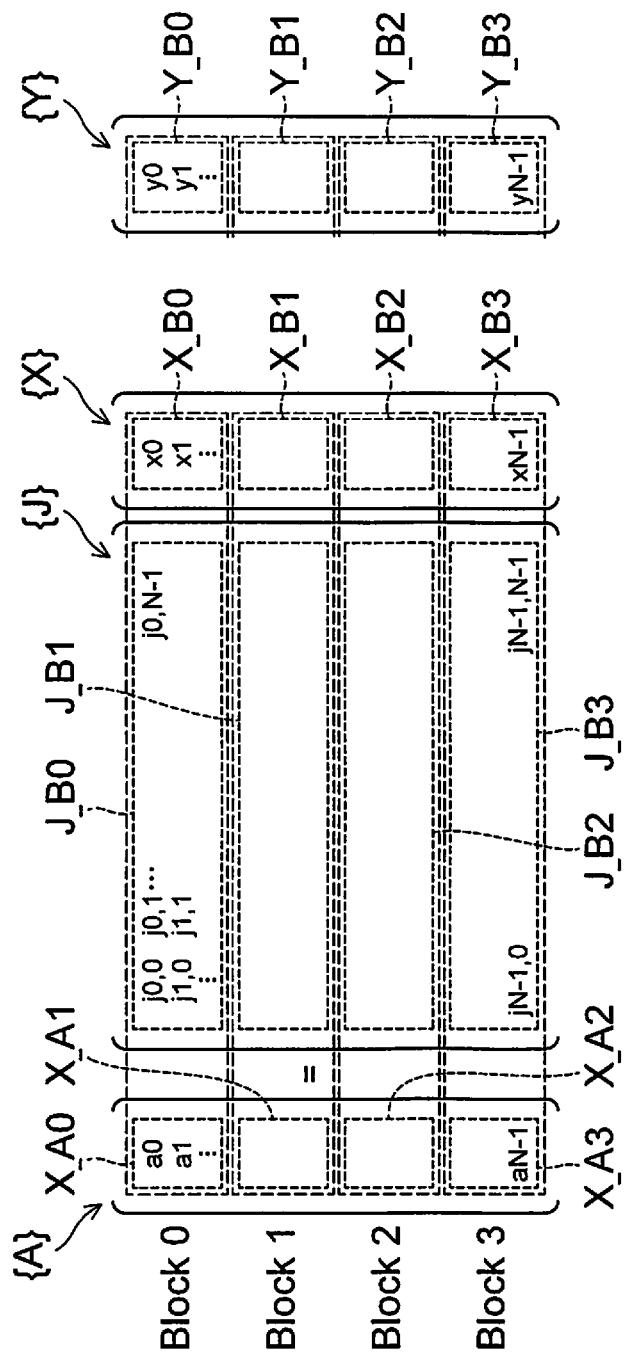
FIG. 15 is a schematic view illustrating a calculating device according to a second embodiment.

FIG. 15 is a schematic view illustrating a calculating device according to a second embodiment.

In the embodiment as shown in FIG. 15, the JX arithmetic and the FY arithmetic are performed by being partitioned into the four parts (Blocks) of Blocks 0 to 3.

These Blocks are larger than the ABlock and the JBlock. One Block includes multiple ABlocks and multiple JBlocks.

Figure 16:
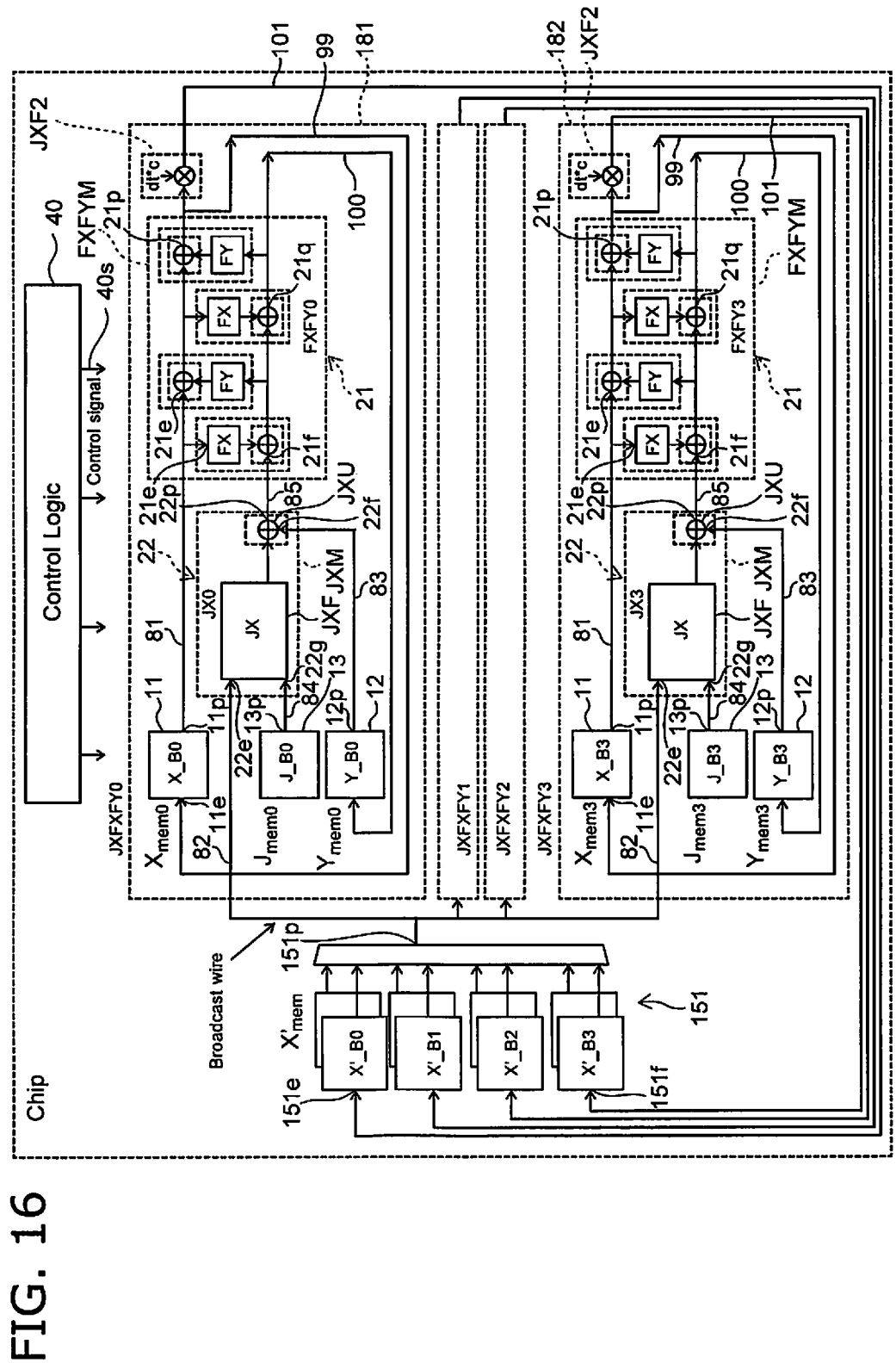
FIG. 16 is a schematic view illustrating the calculating device according to the second embodiment.

FIG. 16 is a schematic view illustrating the calculating device according to the second embodiment.

In the example shown in FIG. 16, for example, multiple JXFXFY modules JXFXFYM are provided inside one semiconductor chip (in-chip division). One of the multiple JXFXFY modules. JXFXFYM includes the Xmem, the Ymem, the Jmem, the JX module JXM, and the FXFY module FXFYM. Xmem0, Ymem0, and Jmem0 of JXFXY0 respectively store the X_B0 data, the Y_B0 data, and the J_B0 data included in BLOCK0. Xmem3, Ymem3, and Jmem3 of JXFXY3 respectively store the X_B3 data, the Y_B3 data, and the J_B3 data included in BLOCK3. The multiple JXFXFY modules JXFXFYM perform the arithmetic of the multiple Blocks simultaneously and in parallel.

For example, one Control Logic circuit and one X'mem memory (global memory) are provided. This circuit and this memory are connected to four JXFXFY modules. The Control Logic circuit and the X'mem memory are shared by the four JXFXFY modules. The output (the read) port of the X'mem memory is connected by a broadcast wire to the four JXFXFY modules. The interior of the X'mem memory is partitioned into blocks of X'_B0 to X'_B3. For example, the X'mem memory is partitioned into various granularities. For example, the output of JXFXFY0 is connected to X'_B0. The output of JXFXFY1 is connected to X'_B1. Thereby, the outputs of the four JXFXFY modules can be written simultaneously to the X'mem memory. For example, the write ports can be increased by partitioning the X'mem memory.

Figure 17:
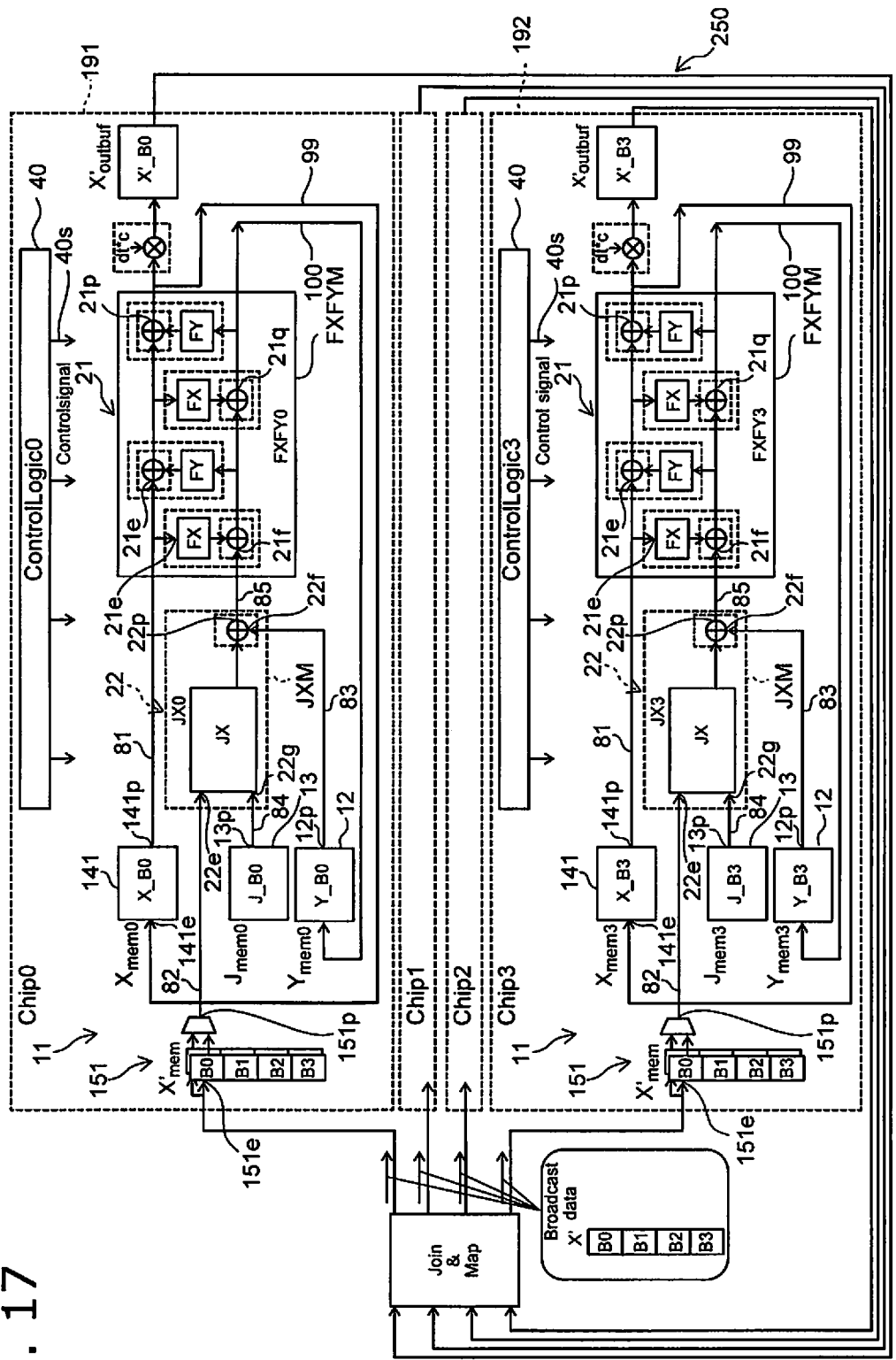
FIG. 17 is a schematic view illustrating a calculating device according to the second embodiment.

FIG. 17 is a schematic view illustrating a calculating device according to the second embodiment.

In the example shown in FIG. 17, the JXFXFY modules are provided in multiple semiconductor chips (multi-chip implementation). The multiple semiconductor chips are connected to each other by interconnection wiring. For example, Chip0 to Chip3 are provided. The first memory 11 (the Xmem memory and the X'mem memory), the second memory 12 (the Ymem memory), the third memory 13 (the Jmem memory), the JX module JXM, the FXFY module FXFYM, and the Control Logic circuit are provided in each of these chips.

A module (Join & Map) may be provided separately from the Chips 0 to 3. The module (Join & Map) combines (joins) the output from the chips and re-distributes (Maps) the output to the chips.

Chip0 includes X'mem0, Xmem0, Ymem0, and Jmem0. Xmem0, Ymem0, and Jmem0 of Chip0 store the X_B0 data, the Y_B0 data, and the J_B0 data included in BLOCK0. X'mem of Chip0 stores the data (X'_B0 to 3) of the X_B0 to 3 data included in the BLOCKs 0 to 3 multiplied by dt*c.

In one loop, Chip0 performs the update of Xdata (X_B0) and Ydata (Y_B0) of BLOCK0 and writes the result back into Xmem0 and Ymem0 of the interior of Chip0. Also, Chip0 outputs the data X'_B0 of X_B0 after the update multiplied by dt*c outside the chip after buffering in X'outbuf.

In one loop, Chip3 performs the update of Xdata (X_B3) and Ydata (Y_B3) of BLOCK3 and writes the result back into Xmem3 and Ymem3 of the interior of Chip3. Chip3 outputs the data X'_B3 of X_B3 after the update multiplied by dt*c outside the chip after buffering in X'outbuf.

The Join & Map combines X'_B0, X'_B03, and X'_B03 output from the chips and broadcasts the result to all of the chips. The chips each receive the X'data distributed from the Join & Map and store the X'data in the X'mem.

Figure 18A:
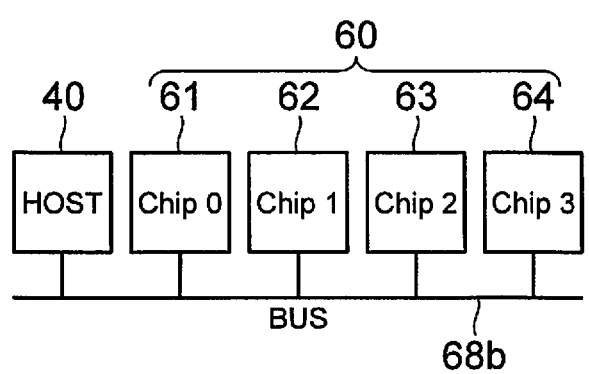
FIG. 18A and FIG. 18B are schematic views illustrating the calculating devices according to the second embodiment.
Figure 18B:
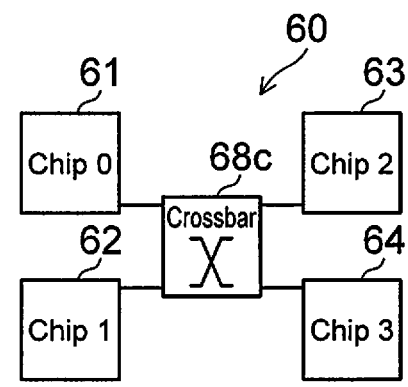

FIG. 18A and FIG. 18B are schematic views illustrating the calculating devices according to the second embodiment.

These drawings show several examples relating to the connections of the multiple chips by interconnection wiring. The interconnection wiring includes a BUS connection and a crossbar.

As shown in FIG. 18A, the multiple chips (a circuit part 60: first to fourth circuit parts 61 to 64) may be connected by a BUS connection 68b. In the case of the example shown in FIG. 18A, the multiple circuit parts 60 may communicate with a "HOST" (e.g., the control circuit 40). For example, a "HOST control" is performed. Or, the multiple circuit parts 60 may have direct communication with each other. For example, direct communication may be performed. In the case of the HOST control, the HOST may perform the arithmetic of Join and Map. In the case of the direct communication, the chips each broadcast the X'Block data; and the other chips receive the data and store the X'mem. Thus, the function of Join & Map is realized by the chips communicating with each other.

As shown in FIG. 18B, the multiple circuit parts 60 may be connected by a crossbar 68c. In the case of the example shown in FIG. 18B, the multiple circuit parts 60 (the multiple chips) include a packet control mechanism (a router) for intercommunication between the multiple circuit parts 60. One of the multiple circuit parts 60 broadcasts the XBlock data to at least one other of the multiple circuit parts 60. Thereby, the x data is shared by the multiple circuit parts 60.

FIG. 19A to FIG. 19F are schematic views illustrating operations of calculating devices according to the embodiment.

Figure 19A:
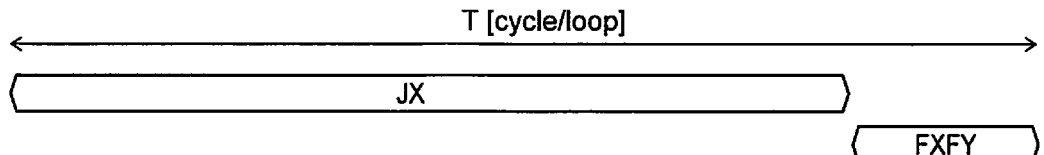
FIG. 19A to FIG. 19F are schematic views illustrating operations of calculating devices according to the embodiment.

In the example of FIG. 19A, the FXFY arithmetic is performed after the JX arithmetic.

Figure 19B:
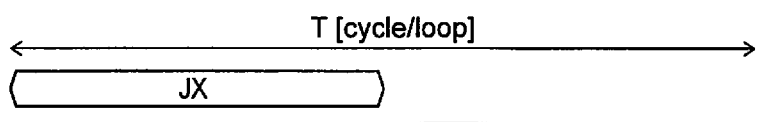

In the example of FIG. 19B, parallel arithmetic of the JX arithmetic is performed. The JX arithmetic can be faster.

Figure 19C:
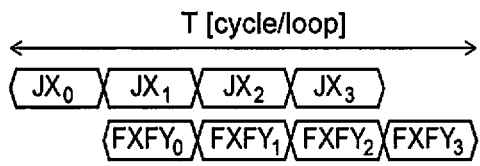

In the example of FIG. 19C, the JX module JXM and the FXFY module FXFYM operate by overlapping each other. Thereby, the arithmetic can be faster.

Figure 19D:
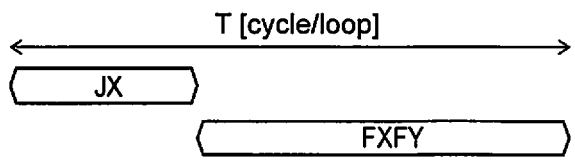

In the example of FIG. 19D, the JX arithmetic is performed in parallel. The JX arithmetic is faster.

Figure 19E:
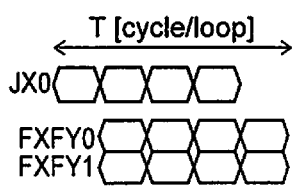

In the example of FIG. 19E, the FXFY module FXFYM is parallelized (multiplexed). Further, the JX module JXM and the FXFY module FXFYM operate by overlapping each other. Thereby, the arithmetic can be faster.

Figure 19F:
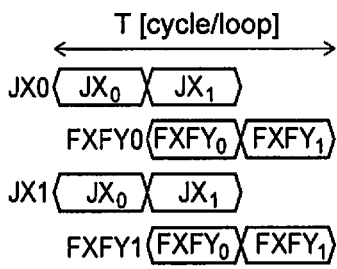

In the example of FIG. 19F, block parallel arithmetic is performed. At least one of in-chip division or multi-chip implementation is performed. Thereby, the arithmetic can be faster.

FIG. 20 is a schematic view illustrating an information processing device including the calculating device according to the embodiment.

As shown in FIG. 20, the information processing device 210 includes the calculating device 120. In the example, multiple calculating devices 120 are provided in the information processing device 210. For example, serial links 73 connect the multiple calculating devices 120 to each other.

The calculating devices 120 are used as a part of the information processing device 210. In one example of the information processing device, for example, an accelerator card 75 that includes the calculating device 120 is provided in a server. The server may be a general server. Other than the calculating device 120, the accelerator card 75 may include memory 76. The information processing device 210 includes, for example, a central processing device (CPU), a main memory, a memory device (SDD), and multiple accelerator cards 75. These are connected to a system bus. For example, a bus interface 74 of the calculating device 120 is connected to the system bus.

FIG. 21 to FIG. 28 are flowcharts illustrating operations of the calculating device according to the embodiment. For example, the calculating device according to the embodiment can perform the arithmetic shown in these figures.

The embodiments may include the following configurations (technological proposals).

Configuration 1

A calculating device, comprising:
a first memory;
a second memory;
a third memory;
a first arithmetic module; and
a second arithmetic module,
an output terminal of the first memory being connected to an input terminal of the first arithmetic module, the output terminal of the first memory being connected to an input terminal of the second arithmetic module, an output terminal of the second memory being connected to an input terminal of the second arithmetic module, an output terminal of the third memory being connected to an input terminal of the second arithmetic module, an output terminal of the second arithmetic module being connected to an input terminal of the first arithmetic module.

Configuration 2

The calculating device according to Configuration 1, wherein the second arithmetic module includes a JX function circuit and a JX update circuit, the output terminal of the first memory and the output terminal of the third memory are connected to an input terminal of the JX function circuit, an output terminal of the JX function circuit and the output terminal of the second memory are connected to an input terminal of the JX update circuit, and an output terminal of the JX update circuit is connected to an input terminal of the first arithmetic module.

Configuration 3

The calculating device according to Configuration 1 or 2, wherein the first arithmetic module includes one or a plurality of circuit sets, the circuit set includes a first arithmetic circuit and a second arithmetic circuit, the first arithmetic circuit includes an FX function circuit and an FX update circuit, the second arithmetic circuit includes an FY function circuit and an FY update circuit, an output terminal of the FX function circuit is connected to an input terminal of the FX update circuit, an output terminal of the FX update circuit is connected to an input terminal of the FY function circuit, and an output terminal of the FY function circuit is connected to an input terminal of the FY update circuit.

Configuration 4

The calculating device according to Configuration 3, wherein the first arithmetic module includes a module input terminal 1, a module input terminal 2, a module output terminal 1, and a module output terminal 2, the module input terminal 1 is connected to an input terminal of the FX function circuit and an input terminal of the FY update circuit, the module input terminal 2 is connected to an input terminal of the FX update circuit, the module output terminal 1 is connected to an output terminal of the FY update circuit, and the module output terminal 2 is connected to an output terminal of the FX update circuit.

Configuration 5

The calculating device according to Configuration 4, wherein the plurality of circuit sets is provided, another one of the plurality of circuit sets includes another first arithmetic circuit and another second arithmetic circuit, the other first arithmetic circuit includes another FX function circuit and another FX update circuit, the other second arithmetic circuit includes another FY function circuit and another FY update circuit, an output terminal of the other FX function circuit is connected to an input terminal of the other FX update circuit, an output terminal of the other FX update circuit is connected to an input terminal of the other FY function circuit, an output terminal of the other FY function circuit is connected to an input terminal of the other FY update circuit, the output terminal of the FX update circuit is connected to an input terminal of the other FX update circuit, and an output terminal of the FY update circuit is connected to an input terminal of the other FX function circuit and an input terminal of the other FY update circuit.

Configuration 6

The calculating device according to Configuration 1 or 2, wherein the first arithmetic module includes one or a plurality of circuit sets, the circuit set includes a first arithmetic circuit and a second arithmetic circuit, the first arithmetic circuit includes an FX function circuit and an FX update circuit, the second arithmetic circuit includes an FY function circuit and an FY update circuit, an output terminal of the FY function circuit is connected to an input terminal of the FY update circuit, an output terminal of the FY update circuit is connected to an input terminal of the FX function circuit, and an output terminal of the FX function circuit is connected to an input terminal of the FX update circuit.

Configuration 7

The calculating device according to Configuration 6, wherein the first arithmetic module includes a module input terminal 1, a module input terminal 2, a module output terminal 1, and a module output terminal 2, the module input terminal 1 is connected to an input terminal of the FY update circuit, the module input terminal 2 is connected to an input terminal of the FY function circuit and an input terminal of the FX update circuit, the module output terminal 1 is connected to an output terminal of the FY update circuit, and the module output terminal 2 is connected to an output terminal of the FX update circuit.

Configuration 8

The calculating device according to Configuration 6, wherein the plurality of circuit sets is provided, another one of the plurality of circuit sets includes another first arithmetic circuit and another second arithmetic circuit, the other first arithmetic circuit includes another FX function circuit and another FX update circuit, the other second arithmetic circuit includes another FY function circuit and another FY update circuit, an output terminal of the other FY function circuit is connected to an input terminal of the other FY update circuit, an output terminal of the other FY update circuit is connected to an input terminal of the other FX function circuit, an output terminal of the other FX function circuit is connected to an input terminal of the other FX update circuit, the output terminal of the FX update circuit is connected to an input terminal of the other FY function circuit and an input terminal of the other FX update circuit, and an output terminal of the FY update circuit is connected to an input terminal of the other FY update circuit.

Configuration 9

The calculating device according to any one of Configurations 3 to 8, wherein
the output of the second arithmetic module is input to the FX update circuit, and
the output of the first memory is input to the FY update circuit.

Configuration 10

The calculating device according to any one of Configurations 1 to 9, wherein
a part of an output terminal of the first arithmetic module is connected to an input terminal of the first memory, and
another part of an output terminal of the first arithmetic module is connected to an input terminal of the second memory.

Configuration 11

The calculating device according to any one of Configurations 1 to 10, wherein
the first memory includes a first memory part and a second memory part,
the second memory part performs a write operation when the first memory part performs a read operation, and
the first memory part performs a write operation when the second memory part performs a read operation.

Configuration 12

The calculating device according to Configurations 1 to 11, wherein
the first memory stores a first variable group $\{x\}$,
the second memory stores a second variable group $\{y\}$,
the third memory stores a first parameter group $\{J\}$,
the first variable group $\{x\}$ includes N (N being an integer of 2 or more) ith entries of a first variable xi (i being an integer not less than 1 and not more than N),
the second variable group $\{y\}$ includes N ith entries of a second variable yi (i being an integer not less than 1 and not more than N),
the first parameter group $\{J\}$ includes N×N first parameters $J_{l,m}$ (l being an integer not less than 1 and not more than N, and m being an integer not less than 1 and not more than N),
the first arithmetic module performs a first variable update and a first sub-update,
the second arithmetic module performs a second sub-update,
the first variable update includes updating the ith entry of the first variable xi based on the ith entry of the second variable yi,
the first sub-update includes updating the ith entry of the second variable yi based on the ith entry of the first variable xi, and
the second sub-update includes updating the ith entry of the second variable yi based on at least a part of the first parameter group $\{J\}$ and at least a part of the first variable group $\{x\}$.

Configuration 13

The calculating device according to Configuration 12, wherein
the second arithmetic module includes a plurality of multipliers, and
a plurality of multiplications included in the updating included in the second sub-update performed based on the at least a part of the first parameter group $\{J\}$ and the at least a part of the first variable group $\{x\}$ is performed in the same clock.

Configuration 14

The calculating device according to Configuration 12 or 13, further comprising a plurality of first wires and a plurality of second wires,
the first parameter group $\{J\}$ including an N×N matrix (N being an integer of 2 or more),
the second arithmetic module including Pr multiply-accumulate modules (Pr being an integer not less than 2 and not more than N, and being a divisor of N), one of the Pr multiply-accumulate modules including Pc multipliers (Pc being an integer not less than 2 and not more than N, and being a divisor of N), Pr corresponding to a degree of parallelism of rows of the matrix, Pc corresponding to a degree of parallelism of columns of the matrix,
the first memory including Pc first memory blocks of the first memory partitioned into Pc memory blocks,
the third memory including Pc third memory blocks of the third memory partitioned into Pc memory blocks,
one of the plurality of first wires connecting one of the Pc first memory blocks and all of the Pr multiply-accumulate modules,
another one of the plurality of first wires connecting another one of the Pc first memory blocks and all of another Pr multiply-accumulate modules,
one of the plurality of second wires connecting one of the Pc third memory blocks and one of the Pr multiply-accumulate modules,
another one of the plurality of second wires connecting the one of the Pc third memory blocks and another one of the Pr multiply-accumulate modules.

Configuration 15

The calculating device according to Configuration 14, wherein at least one of the Pr multiply-accumulate modules includes at least one of a multiplier including a decoder or a multiplier including a data type converter.

Configuration 16

A calculating device, comprising:
a first global memory;
a zeroth module; and
a first module,
the zeroth module including
a 01th memory,
a 02th memory,
a 03th memory,
a 01th arithmetic module, and
a 02th arithmetic module,
an output terminal of the 01th memory being connected to an input terminal of the 01th arithmetic module,
an output terminal of the first global memory being connected to an input terminal of the 02th arithmetic module,
an output terminal of the 02th memory being connected to an input terminal of the 02th arithmetic module,
an output terminal of the 03th memory being connected to an input terminal of the 02th arithmetic module,
an output terminal of the 02th arithmetic module being connected to an input terminal of the 01th arithmetic module,
a part of an output terminal of the 01th arithmetic module being connected to an input terminal of the 01th memory and an input terminal of the first global memory,
the first module including
an eleventh memory,
a twelfth memory,
a thirteenth memory,
an eleventh arithmetic module, and
a twelfth arithmetic module, an output terminal of the eleventh memory being connected to an input terminal of the eleventh arithmetic module, an output terminal of the first global memory being connected to an input terminal of the twelfth arithmetic module, an output terminal of the twelfth memory being connected to an input terminal of the twelfth arithmetic module, an output terminal of the thirteenth memory being connected to an input terminal of the twelfth arithmetic module, an output terminal of the twelfth arithmetic module being connected to an input terminal of the eleventh arithmetic module, a part of an output terminal of the eleventh arithmetic module being connected to an input terminal of the eleventh memory and an input terminal of the first global memory.

Configuration 17

A calculating device, comprising:
a zeroth chip;
a first chip; and
interconnection wiring,
the zeroth chip including
a 01th memory,
a 02th memory,
a 03th memory,
a 01th arithmetic module,
a 02th arithmetic module,
a zeroth chip input terminal, and
a zeroth chip output terminal,
the 01th memory including a 01th local memory and a 01th global memory, an output terminal of the 01th local memory being connected to an input terminal of the 01th arithmetic module, an output terminal of the 01th global memory being connected to an input terminal of the 02th arithmetic module, an output terminal of the 02th memory being connected to an input terminal of the 02th arithmetic module, an output terminal of the 03th memory being connected to an input terminal of the 02th arithmetic module, an output terminal of the 02th arithmetic module being connected to an input terminal of the 01th arithmetic module, a part of an output terminal of the 01th arithmetic module being connected to an input terminal of the 01th local memory and the zeroth chip output terminal, the zeroth chip input terminal being connected to an input terminal of the 01th global memory, the zeroth chip input terminal and the zeroth chip output terminal being connected to the interconnection wiring, the first chip including
an eleventh memory,
a twelfth memory,
a thirteenth memory,
an eleventh arithmetic module,
a twelfth arithmetic module,
a first chip input terminal, and
a first chip output terminal,
the eleventh memory including an eleventh local memory and an eleventh global memory, an output terminal of the eleventh local memory being connected to an input terminal of the eleventh arithmetic module, an output terminal of the eleventh global memory being connected to an input terminal of the twelfth arithmetic module, an output terminal of the twelfth memory being connected to an input terminal of the twelfth arithmetic module, an output terminal of the thirteenth memory being connected to an input terminal of the twelfth arithmetic module, an output terminal of the twelfth arithmetic module being connected to an input terminal of the eleventh arithmetic module, a part of an output terminal of the eleventh arithmetic module being connected to an input terminal of the eleventh local memory and the first chip output terminal, the first chip input terminal being connected to an input terminal of the eleventh global memory, the zeroth chip input terminal, the zeroth chip output terminal, the first chip input terminal, and the first chip output terminal being connected to the interconnection wiring.

The embodiments may include the following configurations (technological proposals).

Configuration A1

A calculating device, comprising:
a first memory $11$;
a second memory $12$;
a third memory $13$;
a first arithmetic module $21$;
a second arithmetic module $22$;
a first conductive line $81$ electrically connecting a first output terminal $11p$ of the first memory $11$ and a first input terminal $21e$ of the first arithmetic module $21$;

a second conductive line $82$ electrically connecting a second output terminal $11q$ of the first memory $11$ and a first input terminal $22e$ of the second arithmetic module $22$;

a third conductive line $83$ electrically connecting a first output terminal $12p$ of the second memory $12$ and a second input terminal $22f$ of the second arithmetic module $22$;

a fourth conductive line $84$ electrically connecting a first output terminal $13p$ of the third memory $13$ and a third input terminal $22g$ of the second arithmetic module $22$; and a fifth conductive line $85$ electrically connecting a first output terminal $22p$ of the second arithmetic module $22$ and a second input terminal $21f$ of the first arithmetic module $21$.

Configuration A2

The calculating device according to Configuration A1, wherein the second arithmetic module $22$ includes a JX function circuit JXF, a JX update circuit JXU, and a sixth conductive line $86$, the first input terminal $22e$ and the third input terminal $22g$ of the second arithmetic module $22$ are provided in the JX function circuit JXF, the second input terminal $22f$ of the second arithmetic module $22$ is provided in the JX update circuit JXU, and the sixth conductive line $86$ electrically connects a first output terminal JXFp of the JX function circuit JXF and a first input terminal JXUe of the JX update circuit JXU.

Configuration A3

The calculating device according to Configuration A1 or A2, wherein the first arithmetic module $21$ includes one or a plurality of circuit sets $21A$, the circuit set $21A$ includes a first arithmetic circuit $21a$ and a second arithmetic circuit $21b$, the first arithmetic circuit $21a$ includes an FX function circuit FXF and an FX update circuit FXU, the second arithmetic circuit $21b$ includes an FY function circuit FYF and an FY update circuit FYU, and the circuit set 21A includes:
a seventh conductive line 87 electrically connecting a first output terminal FXFp of the FX function circuit FXF and a first input terminal FXUe of the FX update circuit FXU;
an eighth conductive line 88 electrically connecting a first output terminal FXUp of the FX update circuit FXU and a first input terminal FYFe of the FY function circuit FYF; and
a ninth conductive line 89 electrically connecting a first output terminal FYFp of the FY function circuit FYF and a first input terminal FYUe of the FY update circuit FYU.

Configuration A4

The calculating device according to Configuration A3, wherein
the first input terminal 21e of the first arithmetic module 21 is provided in the FX function circuit FXF and the FY update circuit FYU,
the second input terminal 21f of the first arithmetic module 21 is provided in the FX update circuit FXU,
a first output terminal 21p of the first arithmetic module 21 is provided in the FY update circuit FYU, and
a second output terminal 21q of the first arithmetic module 21 is provided in the FX update circuit FXU.

Configuration A5

The calculating device according to Configuration A3 or A4, wherein
the plurality of circuit sets 21A is provided,
another one of the plurality of circuit sets 21A includes another first arithmetic circuit 21a and another second arithmetic circuit 21b,
the other first arithmetic circuit 21a includes another FX function circuit FXF and another FX update circuit FXU,
the other second arithmetic circuit 21b includes another FY function circuit FYF and another FY update circuit FYU, and
the other one of the plurality of circuit sets 21A includes:
another seventh conductive line 87 electrically connecting a first output terminal FXFp of the other FX function circuit FXF and a first input terminal FXUe of the other FX update circuit FXU;
another eighth conductive line 88 electrically connecting a first output terminal FXUp of the other FX update circuit FXU and a first input terminal FYFe of the other FY function circuit FYF;
another ninth conductive line 89 electrically connecting a first output terminal FYFp of the other FY function circuit FYF and a first input terminal FYUe of the other FY update circuit FYU;
a tenth conductive line 90 electrically connecting the first output terminal FXUp of the FX update circuit FXU and a second input terminal FXUf of the other FX update circuit FXU;
an eleventh conductive line 91 electrically connecting a first output terminal FYUp of the FY update circuit FYU and a first input terminal FXFe of the other FX function circuit FXF; and
a twelfth conductive line 92 electrically connecting the first output terminal FYUp of the FY update circuit FYU and a second input terminal FYUf of the other FY update circuit FYU.

Configuration A6

The calculating device according to Configuration A1 or A2, wherein
the first arithmetic module 21 includes one or a plurality of circuit sets 21A,
the circuit set 21A includes a first arithmetic circuit 21a and a second arithmetic circuit 21b,
the first arithmetic circuit 21a includes an FX function circuit FXF and an FX update circuit FXU,
the second arithmetic circuit 21b includes an FY function circuit FYF and an FY update circuit FYU, and
the circuit set 21A includes:
a thirteenth conductive line 93 electrically connecting a first output terminal FYFp of the FY function circuit FYF and a first input terminal FYUe of the FY update circuit FYU;
a fourteenth conductive line 94 electrically connecting a first output terminal FYUp of the FY update circuit FYU and a first input terminal FXFe of the FX function circuit FXF; and
a fifteenth conductive line 95 electrically connecting a first output terminal FXFp of the FX function circuit FXF and a first input terminal FXUe of the FX update circuit FXU.

Configuration A7

The calculating device according to Configuration A6, wherein
the first input terminal 21e of the first arithmetic module 21 is provided in the FY update circuit FYU,
the second input terminal 21f of the first arithmetic module 21 is provided in the FY function circuit FYF and the FX update circuit FXU,
a first output terminal 21p of the first arithmetic module 21 is provided in the FY update circuit FYU, and
a second output terminal 21q of the first arithmetic module 21 is provided in the FX update circuit FXU.

Configuration A8

The calculating device according to Configuration A6 or A7, wherein
the plurality of circuit sets 21A is provided,
another one of the plurality of circuit sets 21A includes another first arithmetic circuit 21a and another second arithmetic circuit 21b,
the other first arithmetic circuit 21a includes another FX function circuit FXF and another FX update circuit FXU,
the other second arithmetic circuit 21b includes another FY function circuit FYF and another FY update circuit FYU, and
the other one of the plurality of circuit sets 21A includes:
another thirteenth conductive line 93 electrically connecting a first output terminal FYFp of the other FY function circuit FYF and a first input terminal FYUe of the other FY update circuit FYU;
another fourteenth conductive line 94 electrically connecting a first output terminal FYUp of the other FY update circuit FYU and a first input terminal FXFe of the other FX function circuit FXF;
another fifteenth conductive line 95 electrically connecting a first output terminal FXFp of the other FX function circuit FXF and a first input terminal FXUe of the other FX update circuit FXU;
a sixteenth conductive line 96 electrically connecting a first output terminal FXUp of the FX update circuit FXU and a first input terminal FYFe of the other FY function circuit FYF;
a seventeenth conductive line 97 electrically connecting the first output terminal FXUp of the FX update circuit FXU and a second input terminal FXUf of the other FX update circuit FXU; and an eighteenth conductive line 98 electrically connecting the first output terminal FYUp of the FY update circuit FYU and a second input terminal FYUf of the other FY update circuit FYU.

Configuration A9

The calculating device according to any one of Configurations A1 to A8, further comprising:

a nineteenth conductive line 99 electrically connecting a first output terminal 21p of the first arithmetic module 21 and a first input terminal 11e of the first memory 11; and a twentieth conductive line 100 electrically connecting a second output terminal 21q of the first arithmetic module 21 and a first input terminal 12e of the second memory 12.

Configuration A10

The calculating device according to any one of Configurations A1 to A9, wherein the first memory 11 includes a first memory part 11a and a second memory part 11b, the second memory part 11b performs a write operation when the first memory part 11a performs a read operation, and the first memory part 11a performs a write operation when the second memory part 11b performs a read operation.

Configuration A11

The calculating device according to any one of Configurations A1 to A10, wherein the first memory 11 stores a first variable group $\{x\}$, the second memory 12 stores a second variable group $\{y\}$, the third memory 13 stores a first parameter group $\{J\}$, the first variable group $\{x\}$ includes N (N being an integer of 2 or more) ith entries of a first variable xi (i being an integer not less than 1 and not more than N), the second variable group $\{y\}$ includes N ith entries of a second variable yi (i being an integer not less than 1 and not more than N), the first parameter group $\{J\}$ includes N×N first parameters $J_{l,m}$ (l being an integer not less than 1 and not more than N, and m being an integer not less than 1 and not more than N), the first arithmetic module 21 performs a first variable update and a first sub-update, the second arithmetic module 22 performs a second sub-update, the first variable update includes updating the ith entry of the first variable xi based on the ith entry of the second variable yi, the first sub-update includes updating the ith entry of the second variable yi based on the ith entry of the first variable xi, and the second sub-update includes updating the ith entry of the second variable yi based on at least a part of the first parameter group $\{J\}$ and at least a part of the first variable group $\{x\}$.

Configuration A12

The calculating device according to Configuration A11, wherein the second arithmetic module 21 includes a plurality of multipliers MUL, and a plurality of multiplications included in the updating included in the second sub-update performed based on the at least a part of the first parameter group $\{J\}$ and the at least a part of the first variable group $\{x\}$ is performed in the same clock.

Configuration A13

The calculating device according to Configuration A11 or A12, further comprising a plurality of first wires 11bc and a plurality of second wires 13pc, the first parameter group $\{J\}$ including an N×N matrix (N being an integer of 2 or more), the second arithmetic module 22 including Pr multiply-accumulate modules 22c (Pr being an integer not less than 2 and not more than N, and being a divisor of N), one of the Pr multiply-accumulate modules 22c including Pc multipliers MUL (Pc being an integer not less than 2 and not more than N, and being a divisor of N), Pr corresponding to a degree of parallelism of rows of the matrix, Pc corresponding to a degree of parallelism of columns of the matrix, the first memory 11 including Pc first memory blocks 11d of the first memory 11 partitioned into Pc memory blocks, the third memory 13 including Pc third memory blocks 13d of the third memory 13 partitioned into Pc memory blocks, one of the plurality of first wires 11bc connecting one of the Pc first memory blocks 11d and all of the Pr multiply-accumulate modules 22c, another one of the plurality of first wires 11bc connecting another one of the Pc first memory blocks 11d and all of another Pr multiply-accumulate modules 22c, one of the plurality of second wires 13pc connecting one of the Pc third memory blocks 13d and one of the Pr multiply-accumulate modules 22c, another one of the plurality of second wires 13pc connecting the one of the Pc third memory blocks 13d and another one of the Pr multiply-accumulate modules 22c.

Configuration A14

The calculating device according to Configuration A13, wherein at least one of the Pr multiply-accumulate modules 22c includes at least one of a multiplier including a decoder or a multiplier including a data type converter.

Configuration A15

A calculating device, comprising:

a first global memory 151;

a first module 181; and a second module 182, the first module 181 including a first memory 11, a second memory 12, a third memory 13, a first arithmetic module 21, a second arithmetic module 22, a first conductive line 81 electrically connecting a first output terminal lip of the first memory 11 and a first input terminal 21e of the first arithmetic module 21, a second conductive line 82 electrically connecting a first output terminal 151p of the first global memory 151 and a first input terminal 22e of the second arithmetic module 22, a third conductive line 83 electrically connecting a first output terminal 12p of the second memory 12 and a second input terminal 22f of the second arithmetic module 22, a fourth conductive line 84 electrically connecting a first output terminal 13p of the third memory 13 and a third input terminal 22g of the second arithmetic module 22, a fifth conductive line 85 electrically connecting a first output terminal 22p of the second arithmetic module 22 and a second input terminal 21f of the first arithmetic module 21, a nineteenth conductive line 99 electrically connecting a first output terminal 21p of the first arithmetic module 21 and a first input terminal 11e of the first memory 11, a twentieth conductive line 100 electrically connecting a second output terminal 21q of the first arithmetic module 21 and a first input terminal 12e of the second memory 12, and a twenty-first conductive line 101 electrically connecting the first output terminal 21p of the first arithmetic module 21 and a first input terminal 151e of the first global memory 151, the second module 182 including another first memory 11, another second memory 12, another third memory 13, another first arithmetic module 21, another second arithmetic module 22, another first conductive line 81 electrically connecting a first output terminal 11p of the other first memory 11 and a first input terminal 21e of the other first arithmetic module 21, another second conductive line 82 electrically connecting the first output terminal 151p of the first global memory 151 and a first input terminal 22e of the other second arithmetic module 22, another third conductive line 83 electrically connecting a first output terminal 12p of the other second memory and a second input terminal 22f of the other second arithmetic module 22, another fourth conductive line 84 electrically connecting a first output terminal 13p of the other third memory 13 and a third input terminal 22g of the other second arithmetic module 22, another fifth conductive line 85 electrically connecting a first output terminal 22p of the other second arithmetic module 22 and a second input terminal 21f of the other first arithmetic module 21, another nineteenth conductive line 99 electrically connecting a first output terminal 21p of the other first arithmetic module 21 and a first input terminal 11e of the other first memory 11, another twentieth conductive line 100 electrically connecting a second output terminal 21q of the other first arithmetic module 21 and a first input terminal 12e of the other second memory 12, and another twenty-first conductive line 101 electrically connecting the first output terminal 21p of the other first arithmetic module 21 and a second input terminal 151f of the first global memory 151.

Configuration A16

A calculating device, comprising:

a first chip 191;

a second chip 192; and interconnection wiring 250, the first chip 191 including a first memory 11 including a first local memory 141 and a first global memory 151, a second memory 12, a third memory 13, a first arithmetic module 21, a second arithmetic module 22, a first conductive line 81 electrically connecting a first output terminal 141p of the first local memory 141 and a first input terminal 21e of the first arithmetic module 21, a second conductive line 82 electrically connecting a first output terminal 151p of the first global memory 151 and a first input terminal 22e of the second arithmetic module 22, a third conductive line 83 electrically connecting a first output terminal 12p of the second memory 12 and a second input terminal 22f of the second arithmetic module 22, a fourth conductive line 84 electrically connecting a first output terminal 13p of the third memory 13 and a third input terminal 22g of the second arithmetic module 22, a fifth conductive line 85 electrically connecting a first output terminal 22p of the second arithmetic module 22 and a second input terminal 21f of the first arithmetic module 21, a nineteenth conductive line 99 electrically connecting a first output terminal 21p of the first arithmetic module 21 and a first input terminal 141e of the first local memory 141, and a twentieth conductive line 100 electrically connecting a second output terminal 21q of the first arithmetic module 21 and a first input terminal 12e of the second memory 12, the interconnection wiring 250 electrically connecting the first output terminal 21p of the first arithmetic module 21 and a first input terminal 151e of the first global memory 151, the second chip 192 including another first memory 11 including another first local memory 141 and another first global memory 151, another second memory 12, another third memory 13, another first arithmetic module 21, another second arithmetic module 22, another first conductive line 81 electrically connecting a first output terminal 141p of the other first local memory 141 and a first input terminal 21e of the other first arithmetic module 21, another second conductive line 82 electrically connecting a first output terminal 151p of the other first global memory 151 and a first input terminal 22e of the other second arithmetic module 22, another third conductive line 83 electrically connecting a first output terminal 12p of the other second memory 12 and a second input terminal 22f of the other second arithmetic module 22, another fourth conductive line 84 electrically connecting a first output terminal 13p of the other third memory 13 and a third input terminal 22g of the other second arithmetic module 22, another fifth conductive line 85 electrically connecting a first output terminal 22p of the other second arithmetic module 22 and a second input terminal 21f of the other first arithmetic module 21, another nineteenth conductive line 99 electrically connecting a first output terminal 21p of the other first arithmetic module 21 and a first input terminal 141e of the other first local memory 141, and another twentieth conductive line 100 electrically connecting a second output terminal 21q of the other first arithmetic module 21 and a first input terminal 12e of the other second memory 12, the interconnection wiring 250 electrically connecting the first output terminal 21p of the other first arithmetic module 21 and a first input terminal 151e of the other first global memory 151.

According to the embodiments, a calculating device can be provided in which an optimization problem can be calculated quickly.

Hereinabove, exemplary embodiments of the invention are described with reference to specific examples. However, the embodiments of the invention are not limited to these specific examples. For example, one skilled in the art may similarly practice the invention by appropriately selecting specific configurations of components included in calculating devices such as memories, and arithmetic modules, etc., from known art. Such practice is included in the scope of the invention to the extent that similar effects thereto are obtained.

Further, any two or more components of the specific examples may be combined within the extent of technical feasibility and are included in the scope of the invention to the extent that the purport of the invention is included.

Moreover, all calculating devices practicable by an appropriate design modification by one skilled in the art based on the calculating devices described above as embodiments of the invention also are within the scope of the invention to the extent that the spirit of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A calculating device, comprising:
   a first memory;
   a second memory;
   a third memory;
   a first arithmetic module;
   a second arithmetic module;
   a first conductive line electrically connecting a first output terminal of the first memory and a first input terminal of the first arithmetic module;
   a second conductive line electrically connecting a second output terminal of the first memory and a first input terminal of the second arithmetic module;
   a third conductive line electrically connecting a first output terminal of the second memory and a second input terminal of the second arithmetic module;
   a fourth conductive line electrically connecting a first output terminal of the third memory and a third input terminal of the second arithmetic module; and
   a fifth conductive line electrically connecting a first output terminal of the second arithmetic module and a second input terminal of the first arithmetic module,
   wherein
      the second arithmetic module includes a JX function circuit, a JX update circuit, and a sixth conductive line,
      the first input terminal and the third input terminal of the second arithmetic module are provided in the JX function circuit,
      the second input terminal of the second arithmetic module is provided in the JX update circuit, and
      the sixth conductive line electrically connects a first output terminal of the JX function circuit and a first input terminal of the JX update circuit.

2. The device according to claim 1, wherein
   the first arithmetic module includes one or a plurality of circuit sets,
   the circuit set includes a first arithmetic circuit and a second arithmetic circuit,
   the first arithmetic circuit includes an FX function circuit and an FX update circuit,
   the second arithmetic circuit includes an FY function circuit and an FY update circuit, and
   the circuit set includes:
      a seventh conductive line electrically connecting a first output terminal of the FX function circuit and a first input terminal of the FX update circuit;
      an eighth conductive line electrically connecting a first output terminal of the FX update circuit and a first input terminal of the FY function circuit; and
      a ninth conductive line electrically connecting a first output terminal of the FY function circuit and a first input terminal of the FY update circuit.

3. The device according to claim 2, wherein
   the first input terminal of the first arithmetic module is provided in the FX function circuit and the FY update circuit,
   the second input terminal of the first arithmetic module is provided in the FX update circuit,
   a first output terminal of the first arithmetic module is provided in the FY update circuit, and
   a second output terminal of the first arithmetic module is provided in the FX update circuit.

4. The device according to claim 2, wherein
   the plurality of circuit sets is provided,
   another one of the plurality of circuit sets includes another first arithmetic circuit and another second arithmetic circuit,
   the other first arithmetic circuit includes another FX function circuit and another FX update circuit,
   the other second arithmetic circuit includes another FY function circuit and another FY update circuit, and
   the other one of the plurality of circuit sets includes:
      another seventh conductive line electrically connecting a first output terminal of the other FX function circuit and a first input terminal of the other FX update circuit;
      another eighth conductive line electrically connecting a first output terminal of the other FX update circuit and a first input terminal of the other FY function circuit;
      another ninth conductive line electrically connecting a first output terminal of the other FY function circuit and a first input terminal of the other FY update circuit;
      a tenth conductive line electrically connecting the first output terminal of the FX update circuit and a second input terminal of the other FX update circuit;
      an eleventh conductive line electrically connecting a first output terminal of the FY update circuit and a first input terminal of the other FX function circuit; and
      a twelfth conductive line electrically connecting the first output terminal of the FY update circuit and a second input terminal of the other FY update circuit.

5. The device according to claim 1, wherein
   the first arithmetic module includes one or a plurality of circuit sets,
   the circuit set includes a first arithmetic circuit and a second arithmetic circuit,
   the first arithmetic circuit includes an FX function circuit and an FX update circuit, the second arithmetic circuit includes an FY function circuit and an FY update circuit, and
the circuit set includes:
a thirteenth conductive line electrically connecting a first output terminal of the FY function circuit and a first input terminal of the FY update circuit;
a fourteenth conductive line electrically connecting a first output terminal of the FY update circuit and a first input terminal of the FX function circuit; and
a fifteenth conductive line electrically connecting a first output terminal of the FX function circuit and a first input terminal of the FX update circuit.

6. The device according to claim 5, wherein
the first input terminal of the first arithmetic module is provided in the FY update circuit,
the second input terminal of the first arithmetic module is provided in the FY function circuit and the FX update circuit,
a first output terminal of the first arithmetic module is provided in the FY update circuit, and
a second output terminal of the first arithmetic module is provided in the FX update circuit.

7. The device according to claim 5, wherein
the plurality of circuit sets is provided,
another one of the plurality of circuit sets includes another first arithmetic circuit and another second arithmetic circuit,
the other first arithmetic circuit includes another FX function circuit and another FX update circuit,
the other second arithmetic circuit includes another FY function circuit and another FY update circuit, and
the other one of the plurality of circuit sets includes:
another thirteenth conductive line electrically connecting a first output terminal of the other FY function circuit and a first input terminal of the other FY update circuit;
another fourteenth conductive line electrically connecting a first output terminal of the other FY update circuit and a first input terminal of the other FX function circuit;
another fifteenth conductive line electrically connecting a first output terminal of the other FX function circuit and a first input terminal of the other FX update circuit;
a sixteenth conductive line electrically connecting a first output terminal of the FX update circuit and a first input terminal of the other FY function circuit;
a seventeenth conductive line electrically connecting the first output terminal of the FX update circuit and a second input terminal of the other FX update circuit; and
an eighteenth conductive line electrically connecting the first output terminal of the FY update circuit and a second input terminal of the other FY update circuit.

8. The device according to claim 1, further comprising:
a nineteenth conductive line electrically connecting a first output terminal of the first arithmetic module and a first input terminal of the first memory; and
a twentieth conductive line electrically connecting a second output terminal of the first arithmetic module and a first input terminal of the second memory.

9. The device according to claim 1, wherein
the first memory includes a first memory part and a second memory part,
the second memory part performs a write operation when the first memory part performs a read operation, and
the first memory part performs a write operation when the second memory part performs a read operation.

10. The device according to claim 1, wherein
the first memory stores a first variable group $\{x\}$,
the second memory stores a second variable group $\{y\}$,
the third memory stores a first parameter group $\{J\}$,
the first variable group $\{x\}$ includes N (N being an integer of 2 or more) ith entries of a first variable $xi$ (i being an integer not less than 1 and not more than N),
the second variable group $\{y\}$ includes N ith entries of a second variable $yi$ (i being an integer not less than 1 and not more than N),
the first parameter group $\{J\}$ includes N×N first parameters $J_{l,m}$ (l being an integer not less than 1 and not more than N, and m being an integer not less than 1 and not more than N),
the first arithmetic module performs a first variable update and a first sub-update,
the second arithmetic module performs a second sub-update,
the first variable update includes updating the ith entry of the first variable $xi$ based on the ith entry of the second variable $yi$,
the first sub-update includes updating the ith entry of the second variable $yi$ based on the ith entry of the first variable $xi$, and
the second sub-update includes updating the ith entry of the second variable $yi$ based on at least a part of the first parameter group $\{J\}$ and at least a part of the first variable group $\{x\}$.

11. The device according to claim 10, wherein
the second arithmetic module includes a plurality of multipliers, and
a plurality of multiplications included in the updating included in the second sub-update performed based on the at least a part of the first parameter group $\{J\}$ and the at least a part of the first variable group $\{x\}$ is performed in the same clock.

12. The device according to claim 10, further comprising a plurality of first wires and a plurality of second wires,
the first parameter group $\{J\}$ including an N×N matrix (N being an integer of 2 or more),
the second arithmetic module including Pr multiply-accumulate modules (Pr being an integer not less than 2 and not more than N, and being a divisor of N), one of the Pr multiply-accumulate modules including Pc multipliers (Pc being an integer not less than 2 and not more than N, and being a divisor of N), Pr corresponding to a degree of parallelism of rows of the matrix, Pc corresponding to a degree of parallelism of columns of the matrix,
the first memory including Pc first memory blocks of the first memory partitioned into Pc memory blocks,
the third memory including Pc third memory blocks of the third memory partitioned into Pc memory blocks,
one of the plurality of first wires connecting one of the Pc first memory blocks and all of the Pr multiply-accumulate modules,
another one of the plurality of first wires connecting another one of the Pc first memory blocks and all of another Pr multiply-accumulate modules,
one of the plurality of second wires connecting one of the Pc third memory blocks and one of the Pr multiply-accumulate modules,
another one of the plurality of second wires connecting the one of the Pc third memory blocks and another one of the Pr multiply-accumulate modules.

13. The device according to claim 12, wherein at least one of the Pr multiply-accumulate modules includes at least one of a multiplier including a decoder or a multiplier including a data type converter.

14. A calculating device, comprising:
a first global memory;
a first module; and
a second module,
the first module including
a first memory,
a second memory,
a third memory,
a first arithmetic module,
a second arithmetic module,
a first conductive line electrically connecting a first output terminal of the first memory and a first input terminal of the first arithmetic module,
a second conductive line electrically connecting a first output terminal of the first global memory and a first input terminal of the second arithmetic module,
a third conductive line electrically connecting a first output terminal of the second memory and a second input terminal of the second arithmetic module,
a fourth conductive line electrically connecting a first output terminal of the third memory and a third input terminal of the second arithmetic module,
a fifth conductive line electrically connecting a first output terminal of the second arithmetic module and a second input terminal of the first arithmetic module,
a nineteenth conductive line electrically connecting a first output terminal of the first arithmetic module and a first input terminal of the first memory,
a twentieth conductive line electrically connecting a second output terminal of the first arithmetic module and a first input terminal of the second memory, and
a twenty-first conductive line electrically connecting the first output terminal of the first arithmetic module and a first input terminal of the first global memory,
the second module including
another first memory,
another second memory,
another third memory,
another first arithmetic module,
another second arithmetic module,
another first conductive line electrically connecting a first output terminal of the other first memory and a first input terminal of the other first arithmetic module,
another second conductive line electrically connecting the first output terminal of the first global memory and a first input terminal of the other second arithmetic module,
another third conductive line electrically connecting a first output terminal of the other second memory and a second input terminal of the other second arithmetic module,
another fourth conductive line electrically connecting a first output terminal of the other third memory and a third input terminal of the other second arithmetic module,
another fifth conductive line electrically connecting a first output terminal of the other second arithmetic module and a second input terminal of the other first arithmetic module,
another nineteenth conductive line electrically connecting a first output terminal of the other first arithmetic module and a first input terminal of the other first memory,
another twentieth conductive line electrically connecting a second output terminal of the other first arithmetic module and a first input terminal of the other second memory, and
another twenty-first conductive line electrically connecting the first output terminal of the other first arithmetic module and a second input terminal of the first global memory.

15. A calculating device, comprising:
a first chip;
a second chip; and
interconnection wiring,
the first chip including
a first memory including a first local memory and a first global memory,
a second memory,
a third memory,
a first arithmetic module,
a second arithmetic module,
a first conductive line electrically connecting a first output terminal of the first local memory and a first input terminal of the first arithmetic module,
a second conductive line electrically connecting a first output terminal of the first global memory and a first input terminal of the second arithmetic module,
a third conductive line electrically connecting a first output terminal of the second memory and a second input terminal of the second arithmetic module,
a fourth conductive line electrically connecting a first output terminal of the third memory and a third input terminal of the second arithmetic module,
a fifth conductive line electrically connecting a first output terminal of the second arithmetic module and a second input terminal of the first arithmetic module,
a nineteenth conductive line electrically connecting a first output terminal of the first arithmetic module and a first input terminal of the first local memory, and
a twentieth conductive line electrically connecting a second output terminal of the first arithmetic module and a first input terminal of the second memory,
the interconnection wiring electrically connecting the first output terminal of the first arithmetic module and a first input terminal of the first global memory,
the second chip including
another first memory including another first local memory and another first global memory,
another second memory,
another third memory,
another first arithmetic module,
another second arithmetic module,
another first conductive line electrically connecting a first output terminal of the other first local memory and a first input terminal of the other first arithmetic module,
another second conductive line electrically connecting a first output terminal of the other first global memory and a first input terminal of the other second arithmetic module, another third conductive line electrically connecting a
first output terminal of the other second memory and
a second input terminal of the other second arithmetic module,
another fourth conductive line electrically connecting a
first output terminal of the other third memory and a
third input terminal of the other second arithmetic
module,
another fifth conductive line electrically connecting a
first output terminal of the other second arithmetic
module and a second input terminal of the other first
arithmetic module,
another nineteenth conductive line electrically connecting a first output terminal of the other first arithmetic
module and a first input terminal of the other first
local memory, and
another twentieth conductive line electrically connecting a second output terminal of the other first arithmetic module and a first input terminal of the other
second memory,
the interconnection wiring electrically connecting the first
output terminal of the other first arithmetic module and
a first input terminal of the other first global memory.

16. A calculating device, comprising:
a first memory;
a second memory;
a third memory;
a first arithmetic module;
a second arithmetic module;
a first conductive line electrically connecting a first output terminal of the first memory and a first input terminal of the first arithmetic module;
a second conductive line electrically connecting a second output terminal of the first memory and a first input terminal of the second arithmetic module;
a third conductive line electrically connecting a first output terminal of the second memory and a second input terminal of the second arithmetic module;
a fourth conductive line electrically connecting a first output terminal of the third memory and a third input terminal of the second arithmetic module; and
a fifth conductive line electrically connecting a first output terminal of the second arithmetic module and a second input terminal of the first arithmetic module,
wherein
the first arithmetic module includes one or a plurality of circuit sets,
the circuit set includes a first arithmetic circuit and a second arithmetic circuit,
the first arithmetic circuit includes an FX function circuit and an FX update circuit,
the second arithmetic circuit includes an FY function circuit and an FY update circuit, and
the circuit set includes:
a seventh conductive line electrically connecting a first output terminal of the FX function circuit and a first input terminal of the FX update circuit;
an eighth conductive line electrically connecting a first output terminal of the FX update circuit and a first input terminal of the FY function circuit; and
a ninth conductive line electrically connecting a first output terminal of the FY function circuit and a first input terminal of the FY update circuit.

17. A calculating device, comprising:
a first memory;
a second memory;
a third memory;
a first arithmetic module;
a second arithmetic module;
a first conductive line electrically connecting a first output terminal of the first memory and a first input terminal of the first arithmetic module;
a second conductive line electrically connecting a second output terminal of the first memory and a first input terminal of the second arithmetic module;
a third conductive line electrically connecting a first output terminal of the second memory and a second input terminal of the second arithmetic module;
a fourth conductive line electrically connecting a first output terminal of the third memory and a third input terminal of the second arithmetic module; and
a fifth conductive line electrically connecting a first output terminal of the second arithmetic module and a second input terminal of the first arithmetic module,
wherein
the first arithmetic module includes one or a plurality of circuit sets,
the circuit set includes a first arithmetic circuit and a second arithmetic circuit,
the first arithmetic circuit includes an FX function circuit and an FX update circuit,
the second arithmetic circuit includes an FY function circuit and an FY update circuit, and
the circuit set includes:
a thirteenth conductive line electrically connecting a first output terminal of the FY function circuit and a first input terminal of the FY update circuit;
a fourteenth conductive line electrically connecting a first output terminal of the FY update circuit and a first input terminal of the FX function circuit; and
a fifteenth conductive line electrically connecting a first output terminal of the FX function circuit and a first input terminal of the FX update circuit.

18. A calculating device, comprising:
a first memory;
a second memory;
a third memory;
a first arithmetic module;
a second arithmetic module;
a first conductive line electrically connecting a first output terminal of the first memory and a first input terminal of the first arithmetic module;
a second conductive line electrically connecting a second output terminal of the first memory and a first input terminal of the second arithmetic module;
a third conductive line electrically connecting a first output terminal of the second memory and a second input terminal of the second arithmetic module;
a fourth conductive line electrically connecting a first output terminal of the third memory and a third input terminal of the second arithmetic module;
a fifth conductive line electrically connecting a first output terminal of the second arithmetic module and a second input terminal of the first arithmetic module;
a nineteenth conductive line electrically connecting a first output terminal of the first arithmetic module and a first input terminal of the first memory; and a twentieth conductive line electrically connecting a second output terminal of the first arithmetic module and a first input terminal of the second memory.

19. A calculating device, comprising:
a first memory;
a second memory;
a third memory;
a first arithmetic module;
a second arithmetic module;
a first conductive line electrically connecting a first output terminal of the first memory and a first input terminal of the first arithmetic module;
a second conductive line electrically connecting a second output terminal of the first memory and a first input terminal of the second arithmetic module;
a third conductive line electrically connecting a first output terminal of the second memory and a second input terminal of the second arithmetic module;
a fourth conductive line electrically connecting a first output terminal of the third memory and a third input terminal of the second arithmetic module; and
a fifth conductive line electrically connecting a first output terminal of the second arithmetic module and a second input terminal of the first arithmetic module,
wherein
the first memory includes a first memory part and a second memory part,
the second memory part performs a write operation when the first memory part performs a read operation, and
the first memory part performs a write operation when the second memory part performs a read operation.

20. A calculating device, comprising:
a first memory;
a second memory;
a third memory;
a first arithmetic module;
a second arithmetic module;
a first conductive line electrically connecting a first output terminal of the first memory and a first input terminal of the first arithmetic module;
a second conductive line electrically connecting a second output terminal of the first memory and a first input terminal of the second arithmetic module;
a third conductive line electrically connecting a first output terminal of the second memory and a second input terminal of the second arithmetic module;
a fourth conductive line electrically connecting a first output terminal of the third memory and a third input terminal of the second arithmetic module; and
a fifth conductive line electrically connecting a first output terminal of the second arithmetic module and a second input terminal of the first arithmetic module;
wherein
the first memory stores a first variable group $\{x\}$,
the second memory stores a second variable group $\{y\}$,
the third memory stores a first parameter group $\{J\}$,
the first variable group $\{x\}$ includes N (N being an integer of 2 or more) ith entries of a first variable $x_i$ (i being an integer not less than 1 and not more than N),
the second variable group $\{y\}$ includes N ith entries of a second variable $y_i$ (i being an integer not less than 1 and not more than N),
the first parameter group $\{J\}$ includes N×N first parameters $J_{l,m}$ (l being an integer not less than 1 and not more than N, and m being an integer not less than 1 and not more than N),
the first arithmetic module performs a first variable update and a first sub-update,
the second arithmetic module performs a second sub-update,
the first variable update includes updating the ith entry of the first variable $x_i$ based on the ith entry of the second variable $y_i$,
the first sub-update includes updating the ith entry of the second variable $y_i$ based on the ith entry of the first variable $x_i$, and
the second sub-update includes updating the ith entry of the second variable $y_i$ based on at least a part of the first parameter group $\{J\}$ and at least a part of the first variable group $\{x\}$.

* * * * *